(12) United States Patent
Van Cor

(10) Patent No.: US 9,080,590 B2
(45) Date of Patent: Jul. 14, 2015

(54) THREADED FASTENER AND FASTENER SYSTEM

(76) Inventor: Dale E. Van Cor, Winchester, NH (US)

(*) Notice: Subject to any disclaimer, the term of this patent is extended or adjusted under 35 U.S.C. 154(b) by 585 days.

(21) Appl. No.: 12/148,047

(22) Filed: Apr. 16, 2008

(65) Prior Publication Data

US 2008/0273941 A1 Nov. 6, 2008

Related U.S. Application Data

(63) Continuation-in-part of application No. 11/178,890, filed on Jul. 11, 2005, now abandoned.

(51) Int. Cl.
*F16B 33/02* (2006.01)
*F16B 39/30* (2006.01)
*F16B 35/06* (2006.01)

(52) U.S. Cl.
CPC ............... *F16B 33/02* (2013.01); *F16B 35/06* (2013.01); *F16B 39/30* (2013.01); *Y10T 403/1666* (2013.01)

(58) Field of Classification Search
USPC ........... 411/308–311, 366.1, 366.3, 411, 426; 285/333, 334
See application file for complete search history.

(56) References Cited

U.S. PATENT DOCUMENTS

| | | | | |
|---|---|---|---|---|
| 516,134 | A | * | 3/1894 | Stilwell .................... 411/423 |
| 3,079,181 | A | * | 2/1963 | Van Der Wissel ........... 285/333 |
| 3,129,963 | A | * | 4/1964 | Robbins ..................... 285/334 |
| 4,384,737 | A | * | 5/1983 | Reusser ..................... 285/334 |
| 4,818,167 | A | * | 4/1989 | Hatsutori ................... 411/386 |
| 5,704,750 | A | * | 1/1998 | Bartos et al. ............... 411/411 |
| 5,891,146 | A | * | 4/1999 | Simon et al. ................ 606/71 |
| 2002/0053552 | A1 | * | 5/2002 | Moretti ....................... 215/44 |

* cited by examiner

*Primary Examiner* — Flemming Saether
(74) *Attorney, Agent, or Firm* — Michael J. Persson; Lawson, Persson & Weldon-Francke, P.C.

(57) ABSTRACT

A threaded fastener and threaded fastener system. The threaded fastener includes a body having at least one outer surface and at least one thread forming a spiral about the outer surface of the body. The thread forms a plurality of crests and a plurality of roots and the tangential distance between adjacent crests is substantially constant. The threaded fastener system includes the threaded fastener and a workpiece with an opening having at least one inner surface dimensioned to mate with outer surface of the threaded fastener.

14 Claims, 23 Drawing Sheets

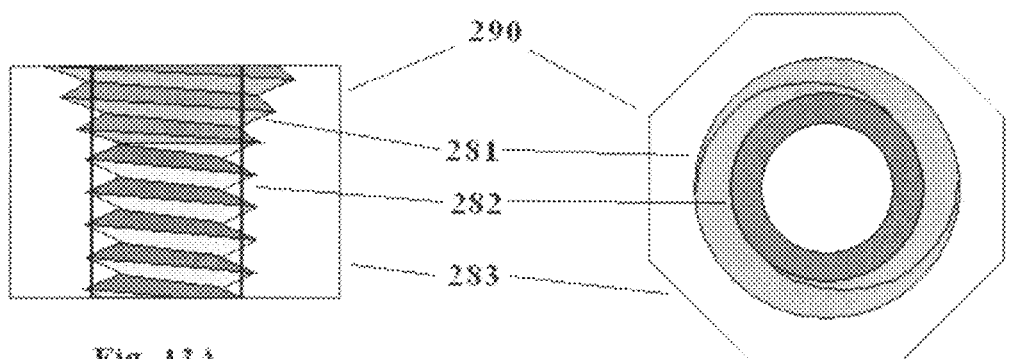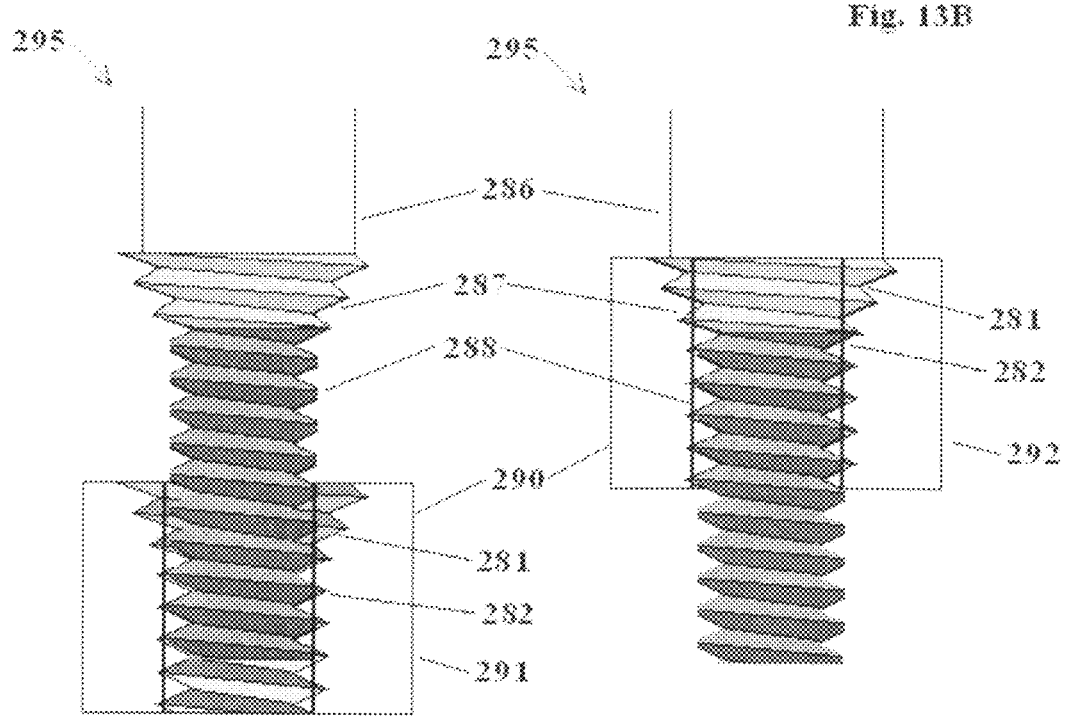
Fig. 13A  Fig. 13B  Fig. 13C  Fig. 13D

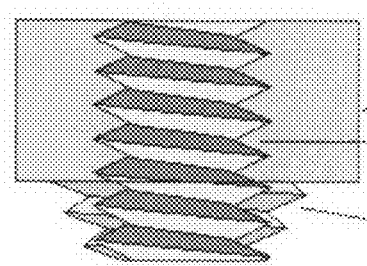
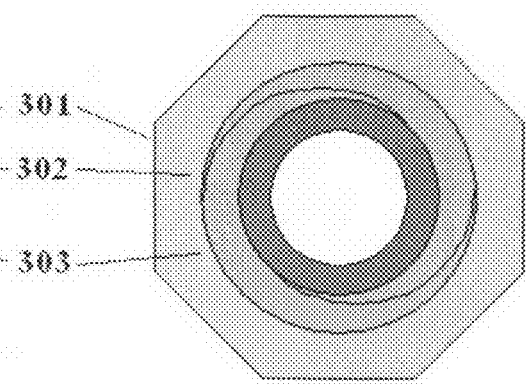
Fig. 14A
Fig. 14B
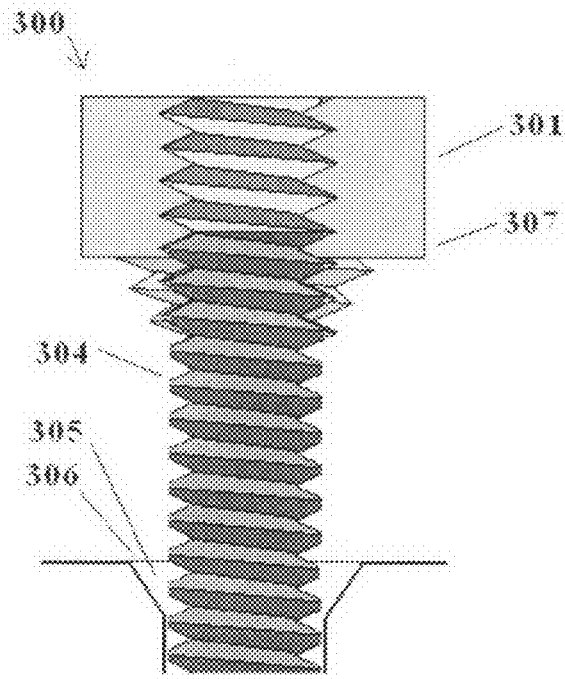
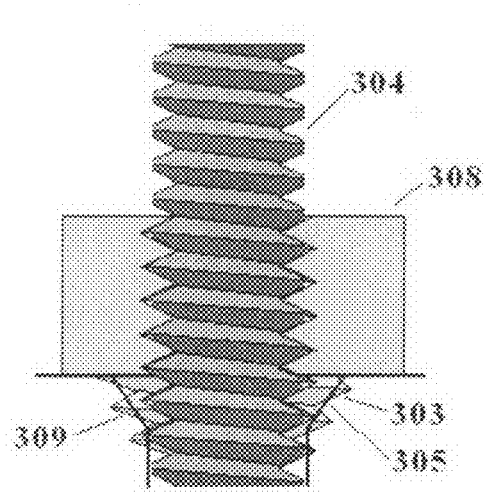
Fig. 14C
Fig. 14D

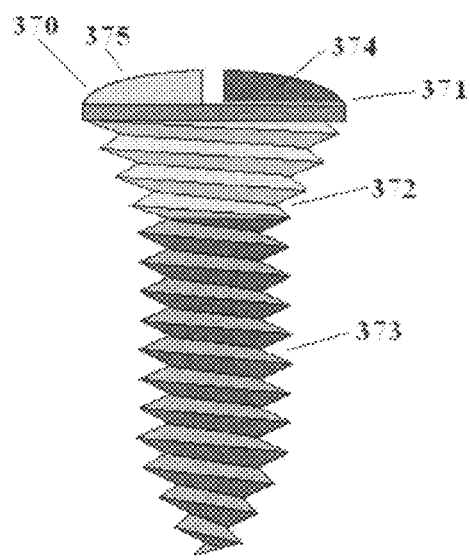
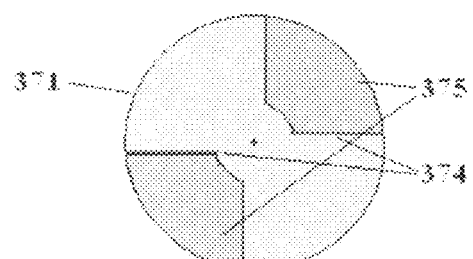
Fig. 18A Fig. 18B Fig. 18C
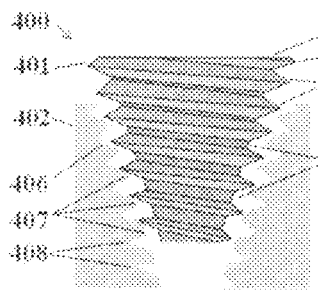 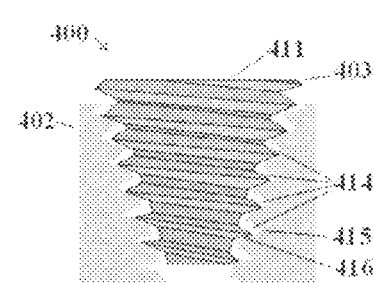 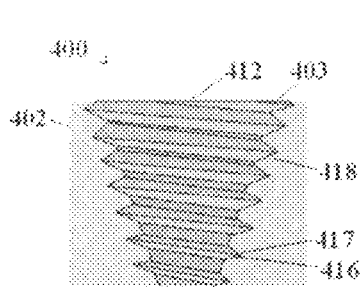
Fig. 19A Fig. 19B Fig. 19C
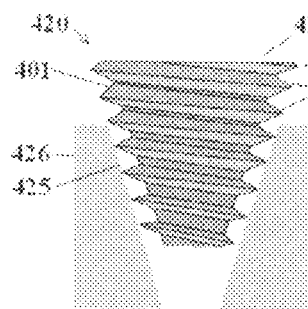 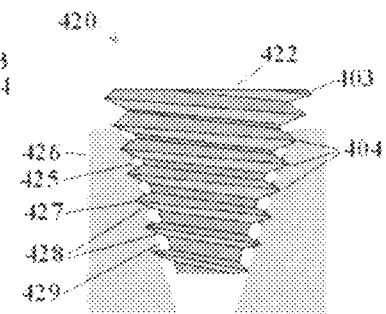 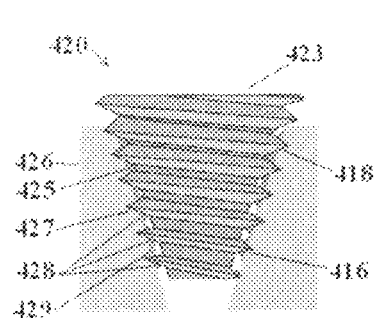
Fig. 19D Fig. 19E Fig. 19F

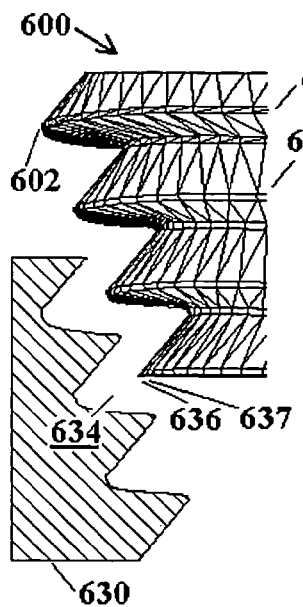
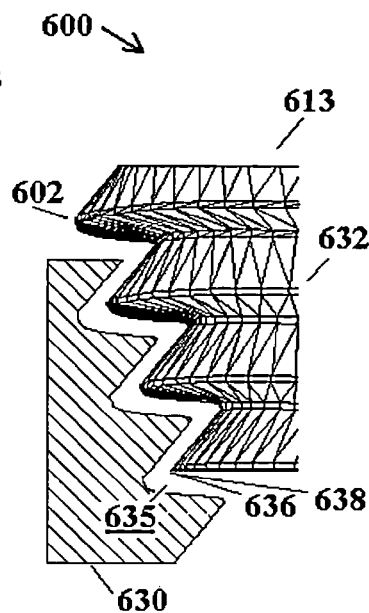
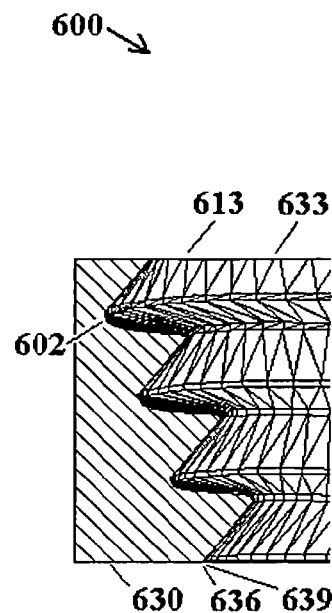
Figure 24A             Figure 24B             Figure 24C
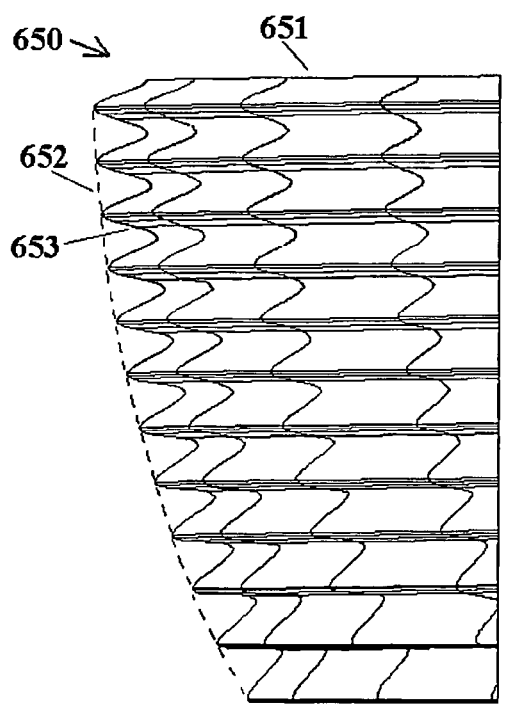
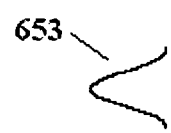
Figure 25A                                             Figure 25B

THREADED FASTENER AND FASTENER SYSTEM

CLAIM OF PRIORITY

This application is a continuation in part of U.S. patent application Ser. No. 11/178,890, filed on Jul. 11, 2005 now abandoned.

FIELD OF THE INVENTION

The present invention relates to the field of fasteners and, in particular, to threaded fasteners and fastener systems that may be quickly and precisely engaged.

BACKGROUND OF THE INVENTION

Threaded fasteners, such as bolts and screws, have been used in a variety of application for many years. Conventional bolts include a thread that is a continuous helical ridge formed on the outside of a cylindrical body. This ridge is called the crest. Between each crest is a space and the bottommost point in this space is called the root. In common bolts, threads are set at an angle to the axis of the bolt, which is called the helix angle. The angle must be sloped, either upward to the right for right-hand threaded screws or upward to the left for left-hand threaded screws. Many threads form a "V" shape between crests. The angle of this "V" is called the thread angle. Thread pitch is the distance from the crest of one thread to another crest measured along the length of the thread. The lead distance is the width across the crests of a single or multiple threads.

Conventional threads are designated or named by the external thread major diameter and a pitch measurement. The major diameter is the outer diameter at the top of the thread crests. Thread sizes are given in nominal sizes, not in the actual measurement, and the exact measurement is slightly below the named or nominal size.

Threads are sometimes identified as "fine" or "coarse". A fine thread will have a relatively small pitch measurement, and the threads will be closer together. A coarse thread has a relatively larger pitch measurement, and the threads will be further apart. A fine thread will have less depth as compared to a coarse thread, and consequently are easier to strip. A coarse thread is more resistant to stripping but also less efficient in transmitting torque into thread tension. Generally, a fine pitch is easier to tighten in that tension is achieved at lower torques.

Conventional threaded fasteners are widely used and are generally effective. However, conventional threaded fasteners have a number of drawbacks that make them inappropriate applications. For threads to interchange and match, both the diameter and pitch must match. Even when threads are properly sized, there will be play or slop between external and internal threads when engaged. This play is thought to be normal and is supposed to disappear when the fastener is tightened, allowing a thread to be a bit larger or smaller than ideal while allowing the bolt to still function adequately. However, if tolerances are exceeded, the fastener may require excessive force to install, causing the thread to fail during tightening, or may result in a sloppy fit, compromising the holding power of the fastener.

Further, because of the unreliable fit of conventional threaded fasteners, and their substantially constant diameter, sealing compounds or gaskets are needed when such fasteners are used in connection with packaged foods or in pressurized applications, such as plumbing, in order to ensure that fluids do not migrate through gaps in the threads and cause leaks. The use of such compounds or gaskets significantly adds to the cost of these applications. Further, even if compounds or gaskets are applied, it is not readily apparent whether such compounds or gaskets are providing an adequate seal.

Another disadvantage of conventional threaded fasteners is that it is difficult to determine their depth, which allows them to be over tightened to extend beyond their intended length. This disadvantage is of greatest detriment in the case of screws, where screw tips can extend beyond the back side of the material to be joined, but is likewise an issue with conventional bolts.

Still another disadvantage of conventional threaded fasteners is the need to properly center the fastener within the hole. Improper centering can result in stripping of the threads and, therefore, care must be taken to ensure that the threads are properly centered to mate with the opening.

Finally, because conventional threaded fasteners require a large number of threads to be engaged in order to provide adequate holding power, and because these threads are of a substantially fixed major diameter, conventional threads must be rotated a large number of times in order to adequately secure them. Accordingly, high-speed assembly of conventional threaded fasteners requires the use of an automated screw gun, or variable speed drill equipped with a driver bit. These devices are cumbersome, expensive, and pose a high risk of stripping the head of the bolt or screw.

Therefore, there is a need for a threaded fastener that produces a tight seal without the use of gaskets or sealants, that is of fixed length and cannot extend beyond its intended design length, that may be tightened, either automatically or by hand, more quickly and easily than conventional fasteners, that is self-centering and therefore fast to setup, that is adapted for use as a wood screw, metal screw, or bolt, that eliminates the need for a screw gun, that distributes the pressure on the threads over a larger surface area of the teeth than a cylinder shape, that is quick tightening fastener and may be used as a self-threading screw for a variety of materials, and that may be specialized for many possible designs by varying angles and profile characteristics.

SUMMARY OF THE INVENTION

The present invention is a conic threaded fastener and conic threaded fastening system that utilizes at least one conic thread. The physics of the conic thread allows greater surface contact than conventional threads. The reason for this is that conventional threads have to be designed with clearance so the male and female can be screwed on with an allowable amount of friction. The cone shape of the conic thread means that the external thread can be inserted well into the internal thread before the threads start to engage. As the conic thread is screwed on, the external thread moves down and outward towards the internal thread at the same time. When the thread is screwed tightly, it is in compression between the internal and external sides.

The conic thread of the conic threaded fastener of the present invention is ideally suited to a number of applications. In food and pharmaceutical packaging applications, many conic threads ensure a strong hold. The conic thread is designed to fully engage many threads with a half a turn and is tight only at the beginning or end. Conversely, a typical screw thread is designed to be loose enough to tighten by hand, but not create a seal. Therefore, the use of a fastener with conic threads makes it possible to eliminate gaskets from conventional food jars, medicine bottles, glue bottles or other dry or wet products that need to be kept as such.

Because conic threads make contact with the flanks of the mating threads, the conic thread forms an inherently tighter seal. In piping for liquids or gases, this allows connections to be made without sealants or compression fittings, as the threads themselves become a dynamic part of making the seal. In plumbing, the threads provide the locking mechanism for holding the sealing members in place. Plumbing pipe threads have a coating applied to the threads before engaging that provides the sealant once tightened. Compression fittings in plumbing and gas lines compress a collar against a nipple or cone to form the seal. The compression force is held by the threads and is not part of the seal. The conic thread provides a simpler solution with fewer dynamic components.

In the fastening industry, precision attachments are automated in most products. The conic screw or nut and bolt have exact lengths and cannot be over tightened. It is on at torque pressure once. In many assembly operations, people with screw guns insert bolts. The conic screw is self-centering making it quicker with less eye hand coordination to install and with fewer rotations will make this inherently quicker.

Other applications would benefit from the ability to create a strong seal quickly. These include the doors of vacuum or pressure chambers and the breeches of guns. The use of fasteners with conic threads in vacuum or explosive chambers uses the sealing characteristics of the conic thread with the securing characteristics to create a fastener design to engage the maximum amount of surfaces. In artillery, the breech loading entry is a locking mechanism that is half thread and half clearance space. The threaded portion is fitted in the clearance space until closed, then rotated less then a half turn so the threads can fully engage providing the lock.

Still another application that would benefit greatly from the use of a conic threaded fastener is the manufacture of valves. A conic threaded valve with a conic threaded plunger and seat would have thread cavities as the flow channel through the valve. When the threads are tighten, the cavity disappears and the channel is closed. These threads can be multiple and a steep angle. If the thread angle is steep enough, then a separate screw would control the plunging and it would look and act similar to a plug valve. Further, as the closing of the channel is gradual, the use of a conic threaded valve allows for precise control of the amount of flow therethrough.

Another benefit of the conic threaded valve is its noise reduction and enhanced mixing properties. As a conic threaded valve does not allow flow in a straight line, it turns the media passing through creating a spinning vortex, which is quieter and mixes better then a straight valve. The conic threaded valve spinning discharge is around its perimeter and discharges inwardly if the flow is in the direction of the small end of the valve. If the flow is from small to large end of the valve, then the large end is designed to direct the flow inwards to achieve the same spinning vortex.

Still another benefit of the conic threaded valve is its extended service life and reduced maintenance. In conic threaded valves, the wearing of the conic threads is uniform enough so the plunger can be turned down more to achieve the same control. This means that the valve can be screwed in more to compensate for wear, keeping this valve operational and reducing the frequency of required maintenance.

Turning now to the structures of the conic fastener and fastener system, in its most basic form the conic threaded fastener includes a body having at least one substantially conic outer surface and at least one conic thread forming a spiral about the substantially conic outer surface of the body. The conic thread forms a plurality of crests and a plurality of roots and the tangential distance between adjacent crests is substantially constant.

In some embodiments, the conic threaded fastener has a body that consists of one substantially conic outer surface. In other embodiments, the fastener has a head and that includes a means for rotating the conic threaded fastener.

In some embodiments, the body of the conic threaded fastener has at least one substantially cylindrical outer surface and at least one conventional thread formed about the substantially cylindrical outer surface of the body. In these embodiments, it is preferred that the body have two substantially conic outer surfaces and one substantially cylindrical outer surface, that the first substantially conic outer surface have a conic head, that the second substantially conic outer surface have a conic tip, and that the substantially cylindrical outer surface is disposed between the conic head and the conic tip.

In some embodiments, the crests and the plurality of roots of the conic threaded fastener form substantially flat surfaces, while other embodiments have crests and roots of different shapes.

Some embodiments of the conic threaded fastener are self-tapping and include at least one conic thread that has means for forming mating threads in an unthreaded conic opening disposed within a workpiece. One such embodiment takes the form of a nut having a top, a bottom, and an interior threaded bore, and in which the body extends from the bottom of the nut and has an interior threaded opening aligned with the interior threaded bore of the nut.

In its most basic form, the conic threaded fastening system includes the conic threaded fastener of the present invention and a workpiece that has at least one opening disposed therein having at least one inner conic surface dimensioned to mate with one of the at least one conic outer surface of the body of the conic threaded fastener.

In embodiments of the conic threaded fastening system in which a self-tapping conic threaded fastener are used, the inner conic surface of at least one conic opening of the workpiece is substantially unthreaded and the conic thread of the conic threaded fastener has means for forming mating threads in the unthreaded inner conic surface of the at least one conic bore of the workpiece. In some such embodiments, the conic threaded fastener further is a nut having a top, a bottom, and an interior threaded bore, and the body extends from the bottom of the nut and has an interior threaded opening aligned with the interior threaded bore of the nut.

In some embodiments of the conic threaded fastening system, the body of the conic threaded fastener has at least one substantially cylindrical outer surface and at least one conventional thread formed about the substantially cylindrical outer surface of the body. In these embodiments, the opening in the workpiece has at least one substantially cylindrical inner surface and at least one substantially conic inner surface. The substantially cylindrical inner surface is dimensioned and threaded to mate with the cylindrical outer surface of the body of the conic threaded fastener and the inner conic surface is dimensioned and threaded to mate with the conic outer surface of the body of the conic threaded fastener.

In other embodiments of the conic threaded fastening system, the body of the conic threaded fastener has two substantially conic outer surfaces and one substantially cylindrical outer surface. The first substantially conic outer surface is a conic head, the second substantially conic outer surface is a conic tip and the substantially cylindrical outer surface is disposed between the conic head and the conic tip. In this embodiment, the opening in the workpiece has one substantially cylindrical inner surface dimensioned and threaded to mate with the at least one substantially cylindrical outer surface of the body of the conic threaded fastener; one substantially conic inner surface dimensioned and threaded to mate with the conic head of the conic threaded fastener, and another substantially conic inner surface dimensioned and threaded to mate with the conic tip of the conic threaded fastener.

In some embodiments of the system, the conic outer surface of the body of the conic threaded fastener is a conic tip and the workpiece is an end cap. In some such embodiments, the end cap has a conic thread formed in the inner conic surface for engaging the conic tip of the conic threaded fastener. In other such embodiments, the conic tip is a self-tapping conic tip and the end cap has an unthreaded inner conic surface for engaging the self-tapping conic tip of the conic threaded fastener.

Other embodiments of the system form a press collar system that also includes at least one elongated member. In these embodiments, the conic threaded fastener is a conic head disposed about the elongated member and the workpiece is a conic seat. The conic head includes a plurality of threaded tabs and is manufactured of a deformable material and the conic seat is dimensioned for disposal about the elongated member and for mating with the conic head. In operation, the tightening of the conic seat onto the conic head causes the threaded conic seat to deform such that the threaded tabs are forced together and such that the conic head forms a compression seal with the elongated member.

Other embodiments of the conic threaded fastening system are used to secure covers to containers. In these embodiments, the fastener is disposed upon and extends from the container and the workpiece is the cover for the container.

Still other embodiments of the conic threaded fastening system form a conic threaded valve system in which the conic threaded fastener is a valve plunger and the workpiece includes a valve seat.

The conic thread was the first type of thread that was developed having the characteristics described herein. However, the conic thread is actually a particular embodiment of a species of thread that is referred to herein as a "spiral thread". The spiral thread is a thread on a body having an expanding shape in which the diameter of the outer surface gets progressively smaller from one end of the fastener to the other end; such as a concave, convex or conic shape. It is noted that, although all conic threads are spiral threads, not all spiral threads are conic threads. This is analogous to a square and a rectangle insofar as a square is always a rectangle, but not all rectangles are squares. Therefore, for purposes of clarity, the spiral thread is referred to herein as a "conic thread" when the spiral thread is disposed upon a body having a conic shape, even though it is both a spiral thread and a conic thread. Similarly, a spiral threaded fastener having a spiral thread disposed about a conic body is referred to as a "conic threaded fastener".

The body of the spiral thread is concave or convex shaped; small at the bottom and large at the top with a spiral wrapped around it. The sides of the concave shaped body curve inwards from bottom to top, which hat means that the vertical measure is accelerating over the horizontal value. The sides of the convex shaped body curve outwards with the horizontal measure accelerating over the vertical value. The curves on these concave and convex shaped bodies can be circular, elliptical, parabolic or hyperbolic.

The attachment of a male and female spiral threaded work pieces is in two operations: insertion to initial contact and rotation to complete engagement. The insertion to initial contact is the male end of the threaded piece being inserted into the female work piece until their threads make first contact. Then the rotation begins and is sustained until complete engagement of the surfaces. They are substantially loose at the beginning and this looseness is reduced with the approach of complete engagement. The looseness is because the mating diameters are not aligned and the rotation brings these diameters together. This has a vertical and a lateral motion caused by the rotation of the threads.

With the cone shape, the initial contact is with all the threads at once. With the concave shape, the initial contact is with the threads on the outer most diameters first, and then the inner diameter threads are picked up with rotation toward complete engagement. With the convex curves, initial contact is with the threads on the inner most diameters first and progresses to the threads on the outer diameters with the rotation toward complete engagement.

A characteristic of the spiral thread and the thread profile is that they do not have to be equal in width. If the profile width is less then the thread width then the result will be a wider flat crest space. If a profile is designed to have a flat crest, then the thread width can be smaller then the profile width and the flat space can be truncated to fit the profile of the next thread. This truncation prevents interference between threads.

The thread profile of a convex or concave shape can be designed to follow the shape of the surface it is being applied to or not. An example is a square wave profile with the flat crest and flat root curved to match the curvature of the concave and convex shape. Spiral threads engage laterally as they are being rotated so shape of the thread profile can be either way. If the local engagement of a male and female thread has matching surface across the length of the spiral thread, then it works.

The design and material of the thread can employ another feature: Skewing. This applies to the crest or root of both the male and female. The skewing the crest is designing the crest so it is bent or slightly deformed. This has to be based on the yield characteristic of the material so the deform crest can be forced into a final engagement with a non-skewed root. Both the root and crest can also be skewed correspondingly. This is a small feature, but it will add to stress holding the threads in place making them more difficult to unscrew, though it may undermine the sealing characteristics.

The thread profile can have other shape characteristics such a being bent upwards in a "hook" shape. The profile crest and root have an upward angle to them. This may be more difficult to machine, but it increases the total surface area that engages, thereby increasing its hold. The shape of the thread profile may be designed dynamically to the resist stripping or deforming the threads because it distributes the energy deeper into the base of the thread.

The teeth of spiral threads can morph into other shapes and sizes as long as they can fit through the area that they must pass in order to engage. Both conic and spiral teeth mate relative to the local area of clearance. The engagement process of the teeth is in two directions. As the threads are screwed together, the threads move downwards and outwards. This allows room for the size and shape to change. A convex thread can have its teeth change from largest to smallest as the thread diameter is reduced. The concave thread is opposite; its teeth can become larger as its thread diameter decreases. The threads can also split into other threads as long as there is local clearance. That means a single helix can be a double, and then triple as long as the surfaces are designed to clearance. A new separate thread system of shape and size can be morphed as long as there is clearance for engagement and that the rate of engagement works with the other threads.

Standard threads typically engage at a constant rate such as inches per revolution. The spiral threads are unique insofar as they may be designed with a changing rate that is either constantly increasing or constantly decreasing.

Standard threads engage through a cylinder and require clearance to reduce the amount of friction. These threads typically have 30-35% surface contact. The conic or spiral threads can have over ninety nine percent surface contact because they do not require the same clearance. Their engagement is from two directions, down and outwards. When the thread has reached its maximum depth, it is at its maximum outward extension as well. This type of surface contact has two inherent qualities: it maximizes the material's coefficient of friction and it creates a seal. The friction means that it will be easier to engage, but much harder to disengage. The sealing characteristic will apply even with 50% or less of surface contact, though a larger percentage is preferred.

Spiral threads can be applied in all the applications of the conic thread, and is especially useful in connection with threaded fasteners and valves. The valve application takes advantage of the two directions of engagement that creates a space between the mating threads. The conic thread can have a uniform change in volume. That means that as it is twisted, the change in volume is equal across the length of the thread. The spiral is difficult to make uniform and, consequently, lends itself to a constant increase or constant decrease in its change in volume. The upside to this is that an expanding gas going through the valve will have a space to expand into as its pressure drops. This will organize the flow, thus reducing turbulence and noise. A fluid will increase in speed as it is forced through a smaller volume. The speed changing characteristics will create unequal wearing characteristics with more wear on the end that has the highest speed. This will allow the valve seating to be designed for this high-wear portion such as 25% on the fastest side while the other 75% will have less wear and thus, seat properly for an extended period. When the valve is closing, the dynamics of how the increasing volume changes with the spiral thread will squeeze out the gas or fluid medium more efficiently then the constant changing conic thread and in a particular direction. The convex threads will squeeze outwards to the larger diameter and the concaved will squeeze inwards towards the smaller diameter. Finally, as changing volumes and pressures also result in changes in temperature when used in connection with gases, some embodiments of the valve have heating or cooling elements added.

Conic and spiral threads are readily adapted for use in connection with soft drink bottles. Because of the sealing characteristics of each type of thread, the use of conic and spiral threads allows the soft plastic inserts in plastic bottle caps to be eliminated. This saves the cost of the plastic material, the manufacture of the insert, the insertion of the insert into the cap, and makes the cap more recyclable.

Conic and spiral threads are also readily adapted for use with bottles, jars and cans. In cans where the tops are soldered on, the concave conic thread would either be on the inside ⅜ inch of the lip or on the outside. This would make the steel can more recyclable. Currently the solder and sometimes the top is a different metal. The cans would also be resealable with a screw-on cover and would not need a can opener. The threads have to be barely wide enough to create a seal with 2-4 leads that is a ¼-½ turn to unscrew. If on the outside, the net diameter does have to exceed the diameter of the can so it can still be used in current handling equipment. This type of thread in the can would be pressed in, not molded or machined. A cover that is outside of the can may be screwed back on for reuse.

Conic and spiral threads are also readily adapted for use with sealed electrical connections. Electrical connections are the bane of the power and electronic world. Ninety percent plus problems are with connections. There are many, many types of electrical and electronic connectors. The strengths of the conic connections are sealed, strength and multiple. There can be multiple leads for many connections. The strength of the connection means that the connecting plugs can be designed to be stronger then their attached cables. The sealing aspects stop outside corrosive gases (air) or fluids. A thread can be longer surface connections then the push plugs reducing resistance where the current flows. The connection is made within an inner portion of the conic thread while the outside portion creates the seal. The thread is preferably manufactured from multiple materials and there can be many threads for communication lines or a two to four for power connections. The seal of power connections can also be made watertight.

Conic and spiral threads are also readily adapted for use with sealed fiber optic connections. In these applications the thread can make a quick, sealed connection between two adjoining fiber optic lines. A compression fitting would allow the insertion into a male end of one line, the female end of the other line and then the two to be compressed with a half twist. Gang connections would be machined made with one thread a different size to insure only one way to connect it, which would bring many fibers into precise alignment. A gang connection could seal many electrical phone lines together with a simple twist that cannot be made without aligning the key. There would not be bend or broken pins. The conic thread has been shown with multiple leads. There can be multiple concentric cones inside of one conic unit. The male and female cones mate in the same fashion, just all at once and at the same rate. This is a multiplier of connections. Computers and electronics are heading for more complex connections with more components and other networks.

PVC and other plastic lines can have the conic or spiral threads made into their ends. This would allow connection without hardware. Just screw them together once. If the plastic is clean, it will hold a seal and have strength to resist coming apart. This could expand the utility of PVC piping in agriculture. The strength is being able to take the pipe apart. Flexible hose has problems with properly drying out. This creates mildew and other biological colonization. The pipes have an inherent drying capability when stored because they are held open.

Attaching components, such as elbows (30,60,90), valves and unions (male/male and female/female) if two lines are made in opposite directions. The male union should always be in the direction of flow. PCV pipe can bend the other angles.

Rubber hose, soft or reinforced, is held to coupling with pressure. The compression fitting designed for this application would use the parabolic properties in which one part of the thread is in a mating thread and the other part is against the hose. This would be three parts: conic mating threads to attach the male/female components; with a threaded nipple that goes inside hose; and a threaded outside male piece. These would be two thread systems one for adjoining and the other a form to compressing the hose in an undulating manor. The hose thread may be more concave to allow more compression to happen away from the end of the hose. For a concave thread, excess hose would be squeezed forward. This small amount of "bunching" would greatly add to the strength of the connection. The net system would allow for a hose diameter clearance plus its compression index.

Finally, a unique application of the spiral thread is as the out shape of a nut and bolt system. A concave thread on the top of a nut or bolt with a shallow profile would create a fastening system that would be difficult to attach to without the correct tools. The rounded shape would be difficult for a pair of pliers to grab onto to remove. This application enhances the security of the fastener.

Therefore, it is an aspect of the present invention to provide a threaded fastener and fastening system that produces a tight seal without the use of gaskets or sealants.

It is a further aspect of the present invention to be incorporated with other fasteners to provide a protective seal and/or enhanced fastening.

It is a further aspect of the present invention to be incorporated with exiting head designs that make the affixing easy, but detaching difficult thus enhancing the security of the fastener.

It is a further aspect of the present invention to provide a fastener and fastening system that is of fixed length and cannot extend beyond its intended design length.

It is a further aspect of the present invention to provide a fastener and fastening system that may be tightened, either automatically or by hand, more quickly and easily than conventional fasteners.

It is a further aspect of the present invention to provide a fastener and fastening system that is self-centering and, therefore, fast to setup.

It is a further aspect of the present invention to provide a fastener and fastening system that is adapted for use as a wood screw, metal screw, or bolt.

It is a further aspect of the present invention to provide a fastener and fastening system that eliminates the need for a screw gun.

It is a further aspect of the present invention to provide a fastener and fastening system that distributes the pressure on the threads over a larger surface area of the teeth than a cylinder shape.

It is a further aspect of the present invention to provide a quick tightening fastener that may be used as a self-threading screw for wood, plastics or metals.

It is a further aspect of the present invention to provide a fastener and fastening system that may be specialized for many designs by varying angles and profile characteristics.

It is a further aspect of the invention to provide a threaded valve utilizing the threaded fastener and fastening system of the present invention.

It is a still further aspect of the invention to provide a threaded valve that reduces noise, provides enhanced mixing characteristics and reduces the frequency of required maintenance.

These aspects of the invention are not meant to be exclusive and other features, aspects, and advantages of the present invention will be readily apparent to those of ordinary skill in the art when read in conjunction with the following description, and accompanying drawings.

BRIEF DESCRIPTION OF THE DRAWINGS

FIG. 13A is a cut away side view of a conic threaded nut threaded to engage the standard threads and conic seat of a hybrid conic threaded fastener.

FIG. 13B is top view of FIG. 13A.

FIGS. 13C-13D are cut away side views of another embodiment of the fastening system of the present invention with a hybrid conic fastener and the conic threaded nut of FIGS. 13A and 13B, cut away to illustrate the engagement of the conic head conic seat and standard threads of the fastener with the threads of the nut.

FIG. 14A is a cut away side view of a conic threaded locknut having a standard interior threads to engage a standard threaded fastener and self-taping exterior conic threads for forming threads in a countersink disposed about the standard threaded fastener.

FIG. 14B is top view of the conic threaded locknut FIG. 14A.

FIGS. 14C-14D are cut away side views of another embodiment of the fastening system of the present invention with a standard threaded fastener extended from a countersink in a workpiece and the conic threaded locknut of FIGS. 14A and 14B, cut away to illustrate the engagement of the interior threads with the fastener and the exterior threads with the countersink.

FIG. 18A is side view of a conic threaded fastener used as a tamper resistant screw.

FIG. 18B is an exploded right side view of the pan head of the tamper resistant screw of FIG. 18A.

FIG. 18C is a top view of the pan head of the tamper resistant screw of FIG. 18A.

FIG. 19A-19C are cut away side views of the conic threads with their geometry changing.

FIGS. 19D-19F are cut away side views the external conic thread in FIGS. 19A-19C used in a self-tapping application.

FIG. 24A is a partial isometric view of the conic threaded fastener of FIG. 23A positioned proximate a point of initial contact with an internal conic threaded workpiece.

FIG. 24B is the conic threaded fastener and workpiece of FIG. 24A after it has been rotated one rotation.

FIG. 24C is the conic threaded fastener and workpiece of FIGS. 24A and 24B at terminal engagement.

FIG. 25A is a partial side isometric view of a spiral threaded fastener with a body having a concave surface.

FIG. 25B is a diagrammatic view of the thread profile of the fastener of FIG. 25A.

FIG. 31A is a partial cross sectional view of the spiral threaded fastener and workpiece of FIG. 31A positioned at a point of initial contact.

DETAILED DESCRIPTION OF THE INVENTION

The conic thread was invented based upon observations made in developing the conic gear described in the inventor's U.S. Pat. No. 6,543,305, which is incorporated herein by reference. The conic gears described in this patent rely upon a unique conix formula, which equates a helical angle of the gear teeth with a conix angle, or angle of the cone. One of the characteristics of the conic teeth is that they are based on mathematical spirals. When these spirals are extended up the cone to a larger diameter, they flatten out approaching the horizontal. When they are extended down the cone to the apex, they approach the vertical. The teeth of conic gears have very special mathematical properties; specifically each tooth maintains an equal tangential distance 99 between its neighbors. This allows standard helical gear teeth to mesh with it.

The conic gear and conic thread share this mathematical relationship; i.e. the tangential distance between the spiraling pitch lines of the conic teeth and the crests of conic threads are both constant. In the case of the conic thread, by extending the spiral upwards to a larger diameter the originating helical angle is lost and the spiral becomes flatter and takes on the appearance of a tapered thread with one exception; a tapered thread is machined linearly, meaning that the thread pitch is constant and the thread may be cut with one pass. The conic thread maintains a constant tangential distance between the teeth, which is exemplified by the portion of the conic threaded fastener 100 shown in FIG. 1.

Figure 1:
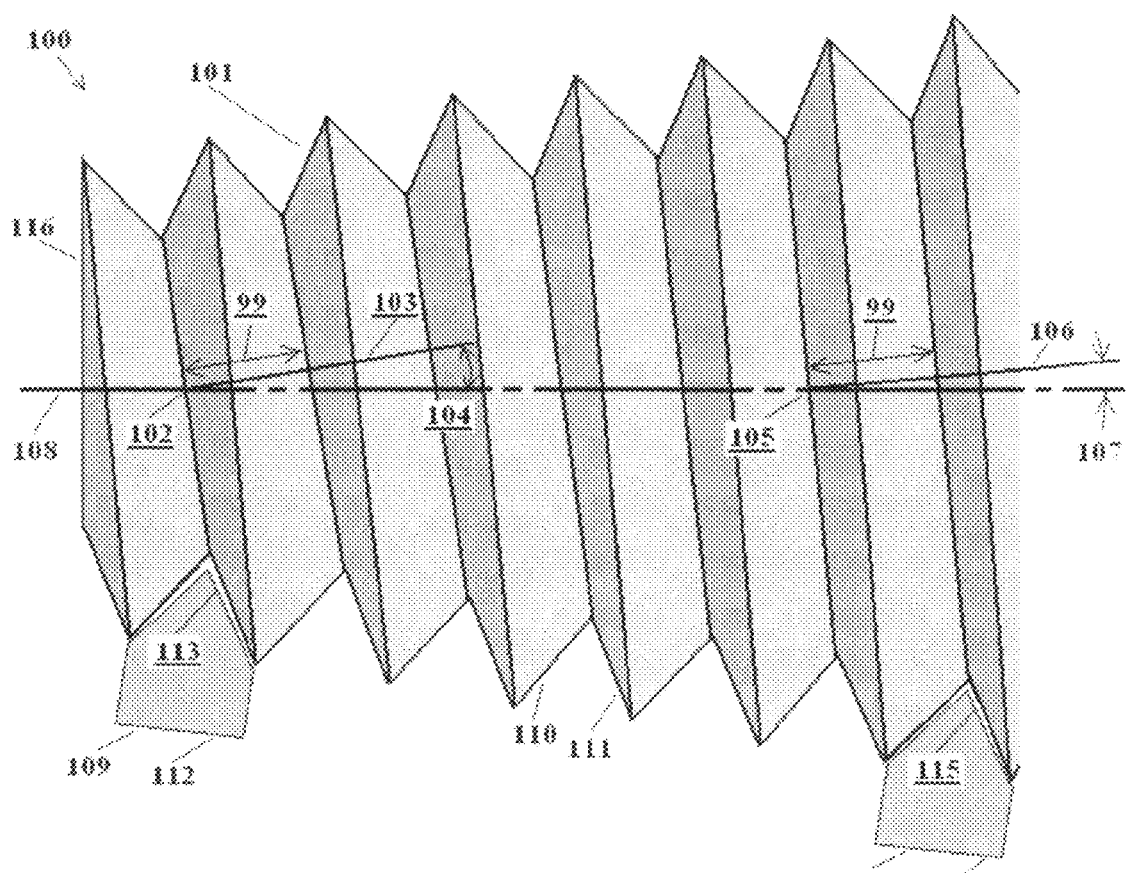
FIG. 1 is a side view of an end of a conic threaded fastener of the present invention showing the relationship between a conic thread and a tapered thread cutting tool.
Figures 7A, 7B:
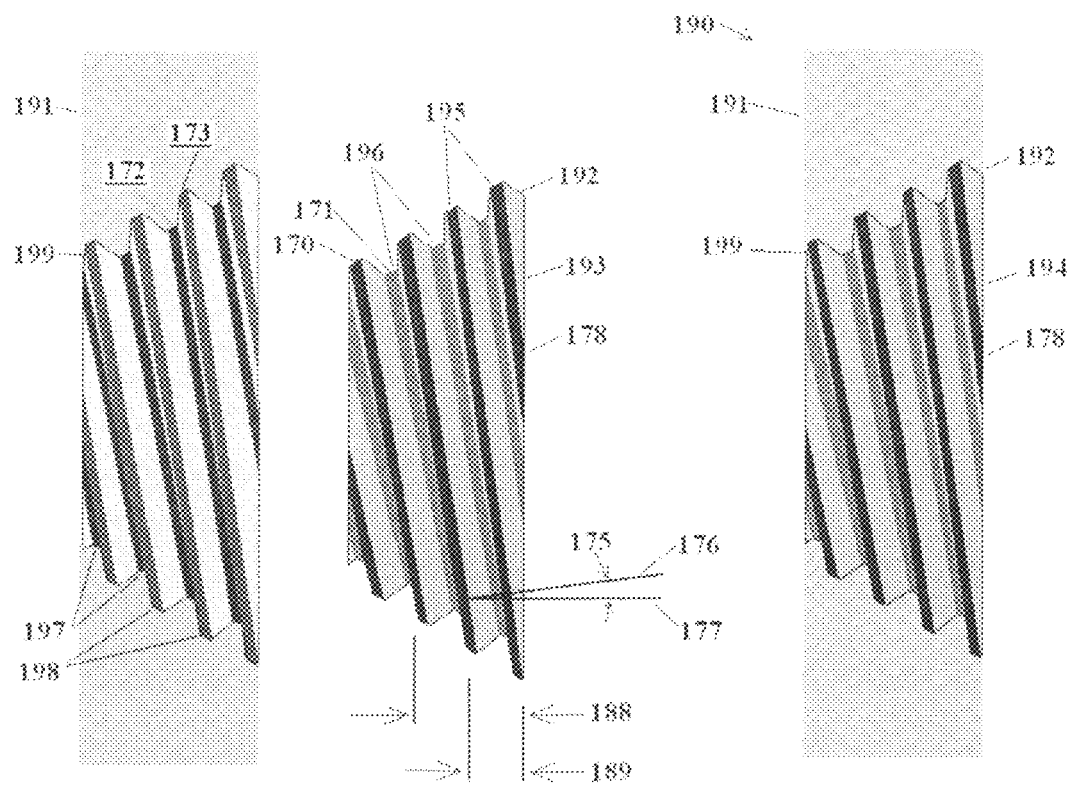
FIGS. 7A-7B are cut away side views of another embodiment of the fastening system of the present invention with a fastener and workpiece cut away to illustrate the engagement of a conic threaded fastener with shaped crests and roots mating with a workpiece having an internal conic thread dimensioned to mate therewith.

As shown in FIG. 1, the external thread 101 of the threaded fastener 100 has a centerline plane 108 through the axis of the substantially conic body 116. From the root of the first tooth 102, a tangent line 103 extending perpendicular from a line tangent to the tooth 102 at the point of intersection between the tooth 102 and the centerline plane 108 has an angle 104. From the root of tooth seven 105, the tangent line 106 has an angle 107 that is smaller than angle 104. This is because as the diameter of the thread increases, the angle of the tangent line from 103 to 106 decreases. In FIG. 1, the tangent line 103, 106 to the conic thread approaches the horizontal centerline plane 108 as the thread diameter increases, but never reaches it. Similarly, FIG. 7A shows the tangent line 176 extending from the intersection between a crest of one thread and a line 177 parallel to the axis of the conic threaded fastener 178. As FIGS. 1 and 7A illustrate, a tangent line, 103, 106, 176 may be drawn from any point on the fastener 101, 178. Thus, the tangential distance 99 is the length of the tangent line 102, 106, 176 from a point on one thread of the fastener 101, 178 to a corresponding point on an adjacent thread.

For a cone shaped fastener having a conventional tapered thread, a cutting tool profile 109 is the same at either end of an external thread. It would have to cuts both flanks 110,111 in one pass, but it cannot. The tapered cutting tool 109 at position 112 does not fit into the conic thread; i.e. there are spaces 113. As the conic thread is extended to a larger diameter and the angle 107 of the tangent line 106 becomes smaller, the tapered cutting tool 109 at position 114 fits better with smaller spaces 115.

The conventional tapered thread is different from the conic thread in that the tapered thread is cut relative to the axis of the cone, whereas the conic thread has to be cut following the changes in the tangential angle 104, 107. The conic thread is either cut twice by a conventional screw machine, or once with an indexed tool. This is because the tangential angle changes, which in turn changes the flanks. Cutting them is not necessarily more expensive, just different. For example, the cutting tool 109 in FIG. 1 rotated relative to the tangent will produce the conic thread. A gang of cutting wheels would each have a profile for a single rotation of the thread. While this would average out the individual rotations, the whole thread would be within tolerance. These tolerances are relative to how quickly the tangential angle 104, 107 of the tangent line 103, 106 changes. Conversely, molding the fastener 100 would result in similar manufacturing cost to those of conventional molded fasteners.

The engagement of a conic threaded fastener system 119 is demonstrated in FIGS. 2A-2F, which shows a workpiece 120 having an internal conic thread 121 and fastener 118 having an external conic thread 122. It is noted that the term "workpiece" is used extensively herein to denote female threaded structures and should be understood to include traditional workpieces as well as female threaded nuts. Similarly, the term "fastener" is used extensively herein to denote male threaded structures and should be understood to include traditional fasteners, such as bolts and screws, as well as other structures, such as jar tops, which include a conic threaded male body.

Figure 2A:
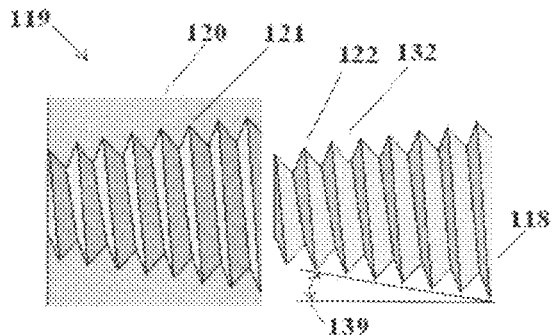
FIGS. 2A-2F are cut away side views of the preferred fastening system of the present invention with a fastener and workpiece cut away to illustrate the engagement of a fastener having external conic threads mating with a workpiece having an internal conic thread.
Figure 2B:
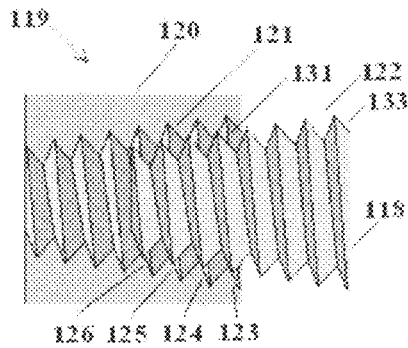

FIG. 2A shows the starting position 132 with both external 122 and internal 121 threads having eight teeth. FIG. 2B has the external threads 122 of the fastener 118 inserted into the workpiece 120 internal threads to position 133 contacting on the fourth tooth 126. Because the first 123, second 124 and third 125 teeth are also initially contacted at the same time, the open space between the teeth 131 is equal.

Figure 2C:
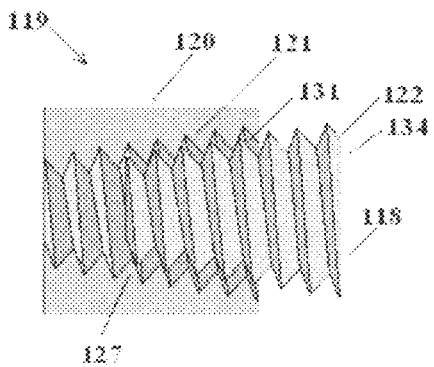
Figure 2D:
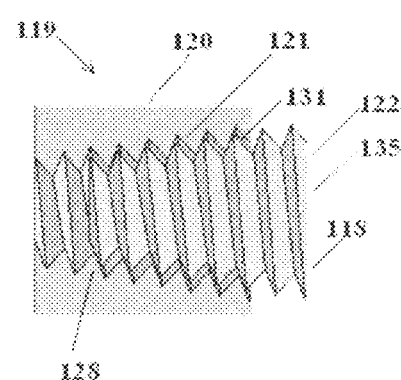
Figure 2E:
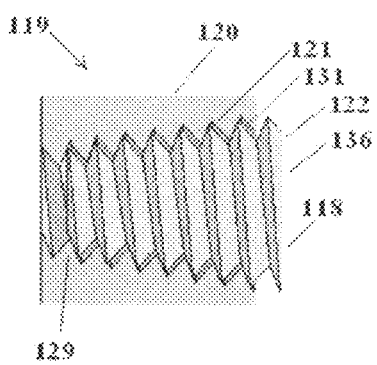

In FIG. 2C the male thread 121 is rotated in contacting the fifth tooth 127 at position 134. It is also apparent that the male thread 121 is approaching the sides of the female thread 122, thus diminishing the open space 131 between them. In FIG. 2D the rotation has reached the sixth tooth 128 at position 135 and there is very little open space 131. In FIG. 2E the open space 131 between the teeth are still apparent, but diminishing. The penetration is to tooth seven 129 at position 136. This open space 131 represents a low-friction working environment. As the male thread is being rotated, the amount of surface contact starts low and increases with every revolution. The amount of space 131 allows freedom of movement. At position 137 in FIG. 2F the open space between the teeth are gone. The rotation has reached the end at tooth eight 130 and male and female conic threads are in full contact.

Through FIGS. 2A-2F, the front and back flanks of the male and female threads 121, 122 have been approaching until they finally contact one another. The impact of this is that the last "snug" operation is what tightens this system 119. Until this last few percent of rotation the tightening process is loose and easy. It is noted that coating conic threads with a coating that reacts under pressure makes this an even stronger connection.

Figure 2F:
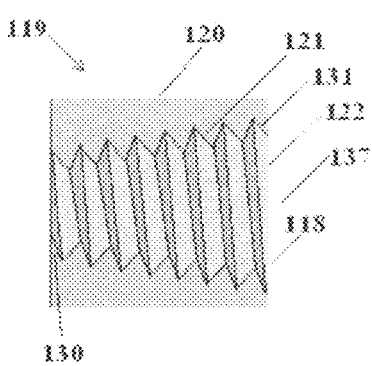
Figure 3:
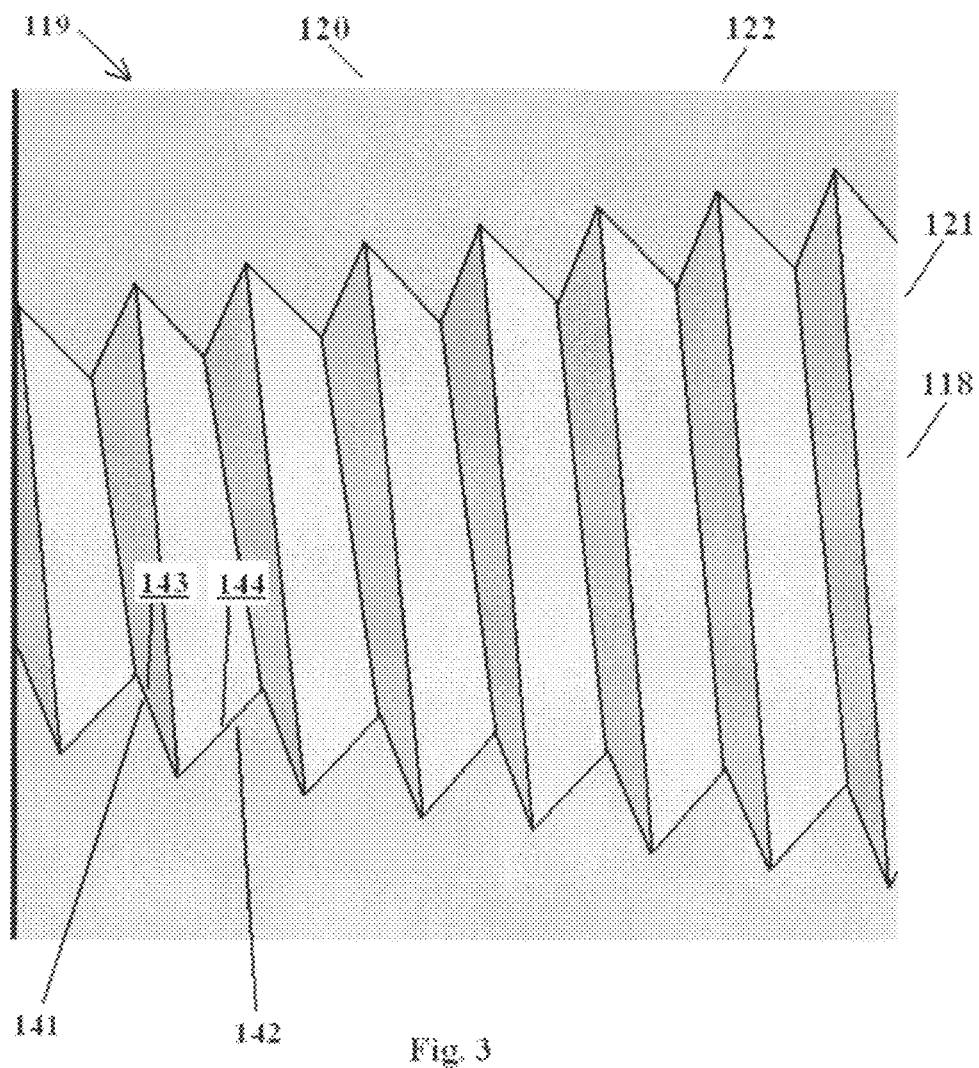
FIG. 3 is an enlarged view of FIG. 2F showing the preferred fastening system fully engaged.

The surface contact created by a fastener system 119 having a conic thread 121 in the fastener 118 and a female conically threaded bore 121 in workpiece 120 of FIG. 2F is enlarged in FIG. 3. Here the front face 143 and the back face 144 of the male thread 121 is in full contract with the front face 141 and back face 142 of the female thread 122. The significance of that is that the coefficient of friction over this much surface area makes this a very strong connection. Conversely, a conventional nut and bolt thread connection has about 35% surface contact. Too much friction would make it to hard to screw on, so there is a clearance space between the crest and root of the threads. Also the threads sizes are not a perfect match; conventional male treads are smaller than their female counterparts.

Figure 4A:
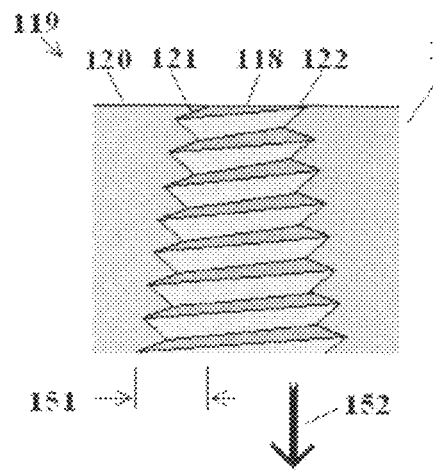
FIG. 4A is a cut away side view of one embodiment of a fully engaged fastening system of the present invention showing the direction of a shearing force.
Figure 4B:
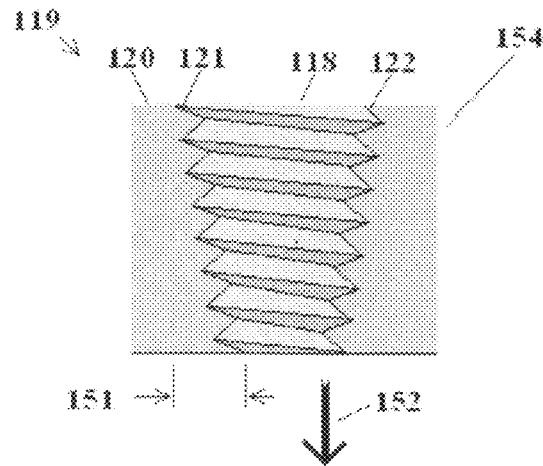
FIG. 4B is the fastener of FIG. 4A rotated one hundred and eighty degrees to show the shearing force in the opposed direction.

Another attribute of the conic thread compared to the standard thread has to do with shearing forces. Comparing a fastener 119 having internal 121 and external 122 conic threads in FIGS. 4A and 4B with a fastener 160 having a standard internal 161 and external 167 threads in FIG. 5 demonstrates this difference. In FIGS. 4A and 4B, the fastener 119 having a conic thread 121 is shown in two opposed positions 153, 154. FIG. 4A has position 153 and the shearing force 152 is over the width of the cone teeth 151. The effect is that the shearing force of the teeth is distributed over the net 151 of the conic thread from top to bottom.

Figure 5:
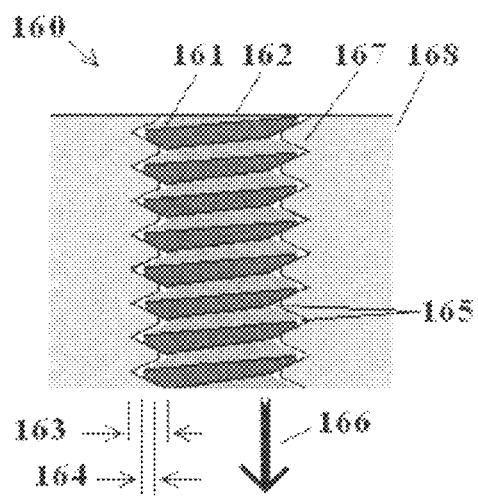
FIG. 5 is a cut away side view of a standard threaded fastening system showing a shearing force.

The fastener 160 in FIG. 5 shows the male thread 161 on the cylinder 162 fully engaged with the female thread 167 in the workpiece 168. The difference between the width of the teeth 163 and the width 164 that the sharing force 166 acts on is the clearance space 165. It is comparatively smaller than in the width 151 upon which the shearing force acts upon the fastener 119 of FIG. 4A. That means that a force is be distributed over a larger number of square inches in the fastener 119 of FIG. 4A than in the conventional fastener of FIG. 5, effectively reducing the magnitude of the load for a given level of shearing force. In FIG. 4B, the fastener 119 conic threads 121, 122 are in position 154. Here, the cone shape enhances the shearing characteristics even more in that it is not only shearing the teeth, but has to rip the workpiece 120 apart as well, further increasing the area and thickness that the shearing force has to act on.

The conic angle of the conic thread has similar characteristics of the conic gear. The tangential distance between the threads is constant. Technically, the thread is a spiral. The angle of the cone is called the conix. Different conix angles of the conic thread changes the number of revolutions that same size threads uses to fully engage. The conic thread 121 in FIGS. 2A-F has a conix angle 139 of 9.18 degrees and it takes four revolutions to fully engage eight teeth. The fastener 180 in FIGS. 6B-6C has a conix angle 187 of 29.33 degrees and it takes one revolution to engage nine teeth. The thread profile is the same size at a sixty degree angle to the face of the cone in FIGS. 2 and 6, and each has same starting diameter.

Figures 6A, 6B, 6C:
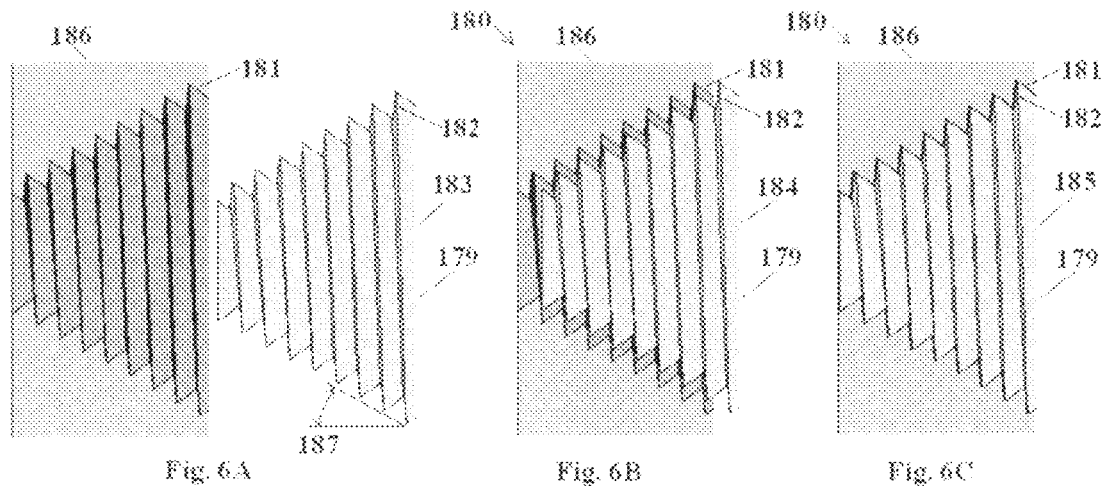
FIGS. 6A-6C are cut away side views of another embodiment of the fastening system of the present invention with a fastener and workpiece cut away to illustrate the engagement of a fastener with a larger conix angle than the fastener of FIGS. 2A-2F mating with a workpiece having an internal conic thread.

FIG. 6A shows the external thread 182 of male component 179 at position 183 outside of the internal thread 181 in work piece 186. FIG. 6B has the external thread 182 of the male component 179 penetrating the internal thread 181 in work piece 186 to its initial contact with the internal thread at position 184. FIG. 6C has the complete fastening 180 of the external thread 181 to the internal thread 182 at position 185 and this full insertion was accomplished in one revolution.

FIGS. 7A and 7B show still another embodiment of the fastening system 190 of the present invention in which the conic threaded fastener 178 with an external thread 192 has flat crests 195 and roots 196, and the workpiece 191 with an internal thread 199 has mating crests 197 and roots 198. The internal 199 and external 192 threads are a double lead.

In FIG. 7A the external thread 192 on the conic threaded fastener 178 is at position 192 beside the internal workpiece 191. The width of the thread 189 is half of the width of the double lead 189. Additional leads change the helix angle of the thread. The tangent angle 175 is shown between the tangent line 176 and the plane 177 parallel to a plane perpendicular with the axis of conic threaded fastener 178. What ever helix angle the thread is, its tangent and thus the profile of the thread is perpendicular to it.

FIG. 7B shows a complete insertion of the conic threaded fastener 178 into the workpiece 191 with external thread 192 against the internal thread 192 at position 194 making the fastening 190.

In the embodiment of FIGS. 7A and 7B, the crests 195, 197 and roots 196, 198 have a flat shape that forms a substantially flat surface 170, 171, 172, 173 instead of the triangular shape shown in connection with other embodiments. However, other embodiments may have crests and roots that are rounded, parabolic, elliptical, or prismatic, depending upon the specific needs of the application for which it will be used. For example, in applications in which the conic threaded fastener 178 will be repeatedly tightened and loosened, such as in the valve applications discussed below with reference to FIGS. 21 and 22, the substantially flat crested fastener 178 of FIGS. 7A and 7B is preferred due to its resistance to deformation after repeated uses. In embodiments requiring additional surface contact, a rounded, parabolic or elliptical shape may provide enhanced surface area for sealing, while likewise providing enhanced durability.

Figure 8:
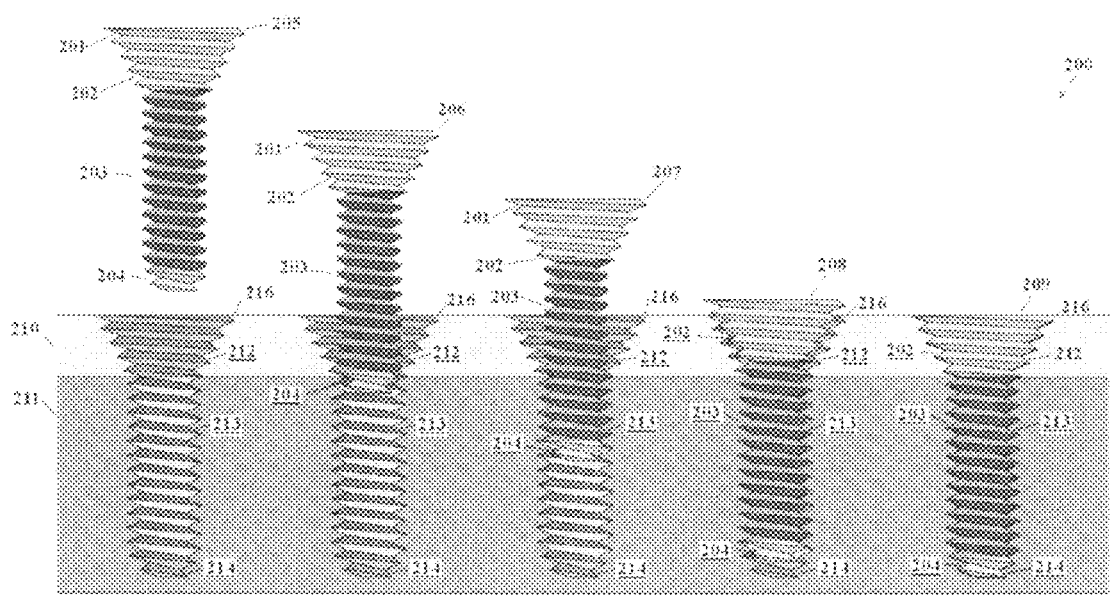
FIG. 8 is a cut away side view of another embodiment of the fastening system of the present invention with a plurality of hybrid conic fasteners and workpieces cut away to illustrate the engagement of fasteners with conic head, conic seat, conic bottom, standard threads and conic tip with a workpiece having internal conic threads.

The conic thread can be combined with standard threads as shown in FIG. 8 to form a hybrid fastener 200. FIG. 8 has five positions of penetration of a combination conic screw 201 into workpieces 210 and 211, thus attaching them. At position 205 the male component 201 is over the female component in work piece 210. The male 201 has a conic head 202, a standard threaded shank 203 and a conic tip 204. The female component 216 of female workpiece 210 has the receiving conic seat 212. The male workpiece 211 has a standard threaded shank 213 and receiving conic tip 214. By incorporating a conic head 202 with standard threaded shank 203, both the locking and sealing characteristic of the conic thread can be obtained in a conventional type fastener, eliminating the need for sealants and keeping air and other corrosives out. Further, in applications where the diameter of the fastener is a significant concern, the combination of the conventional thread and conic thread allows for an increase in holding power with a decreased footprint over what could be achieve with a similarly sized conventional or conically threaded fastener.

At position 206 the male component 201 has the conic tip 204 penetrating the female component 216 to where the first standard thread 203 touches the first receiving standard thread 213. The first five rotations of the male 201 will draw it into the female standard thread 213 as shown at position 207. By position 208, the male conic head 202 is at the beginning of the female conic seat 212 and the male conic tip 204 is at the beginning of the female conic bottom 214. By the last position 209 all the standard and conic treads are engaged with the last fastening revolution.

Figure 9:
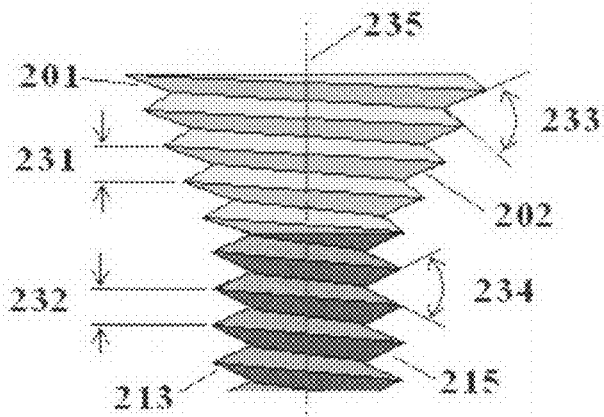
FIG. 9 is an enlarged side view of the head portion of one embodiment of a hybrid conic fastener showing the conic head attached to a standard thread.

A closer look at the combination of external conic 202 and standard threads 215 shown in FIG. 9, has the conic head 201 attached to the standard threaded shank 213. The conic thread 202 has to be equated with the standard thread 215 rate of penetration on the axis 235 of the thread, so the lateral width 231 of the conic thread 202 is equal to the pitch width 232 of the standard thread 215. The result is the thread angle 233 of the conic thread 202 does not match the thread angle 234 of the standard thread. This is characteristic of such a combination and is of no consequence to its function.

Figures 10A, 10B:
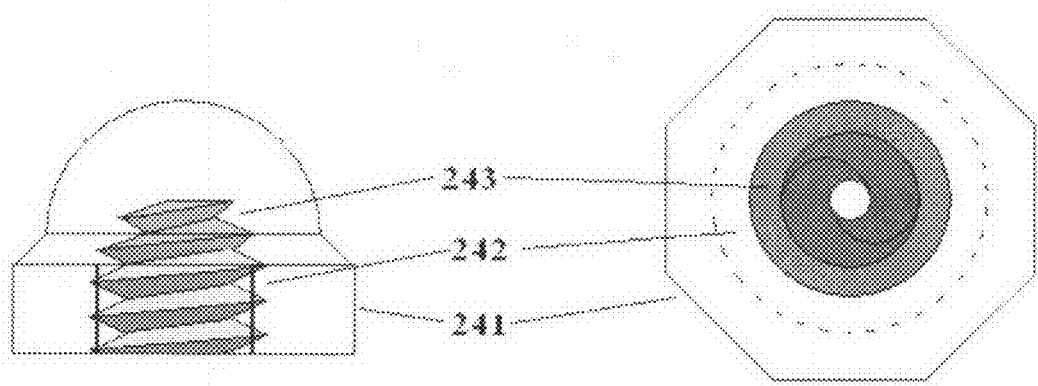
FIG. 10A is a cut away side view of a conic threaded end cap having a conic threaded bottom for engaging a conic tip of a conic fastener.
FIG. 10B is a bottom view of the end cap of FIG. 10A.
Figures 10C, 10D:
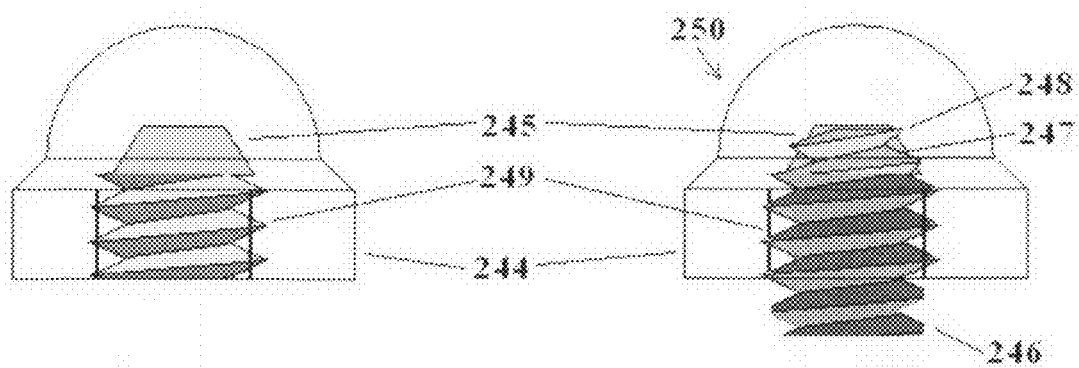
FIG. 10C is a cut away side view of an end cap having an unthreaded conic bottom for engaging a self-tapping conic tip of a conic fastener.
FIG. 10D is a cut away side view of the end cap of FIG. 10C engaging a conic tip of a conic fastener.

The fastener of the present invention can be used in fastening systems 250, having end caps 241 shown FIG. 10A-10B or end caps 244 shown in FIG. 10C-10D. FIG. 10A is a transparency of an end cap 241 having a standard internal female thread 242 and with a conic tip 243. FIG. 10B is the bottom view of the end cap 241 of FIG. 10A. These caps 244 can also be designed as self-tapping shown in FIG. 10D. The top is a receiving cone 245 for the conic tip 248 of the bolt 246. The functional width 247 of the receiving cone 245 is for self-taping varies with material hardness, the harder the material, the less the amount of penetration possible.

Figure 11A:
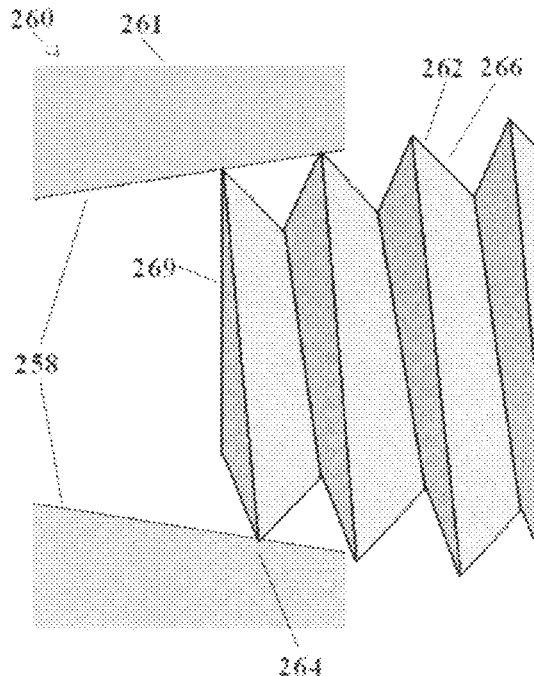
FIGS. 11A-11C are cut away side views of another embodiment of the fastening system of the present invention with a fastener and workpiece cut away to illustrate the engagement of a conic tip of a self-tapping conic threaded fastener forming threads in a workpiece by deforming a workpiece having an unthreaded conic opening therein.
Figure 11B:
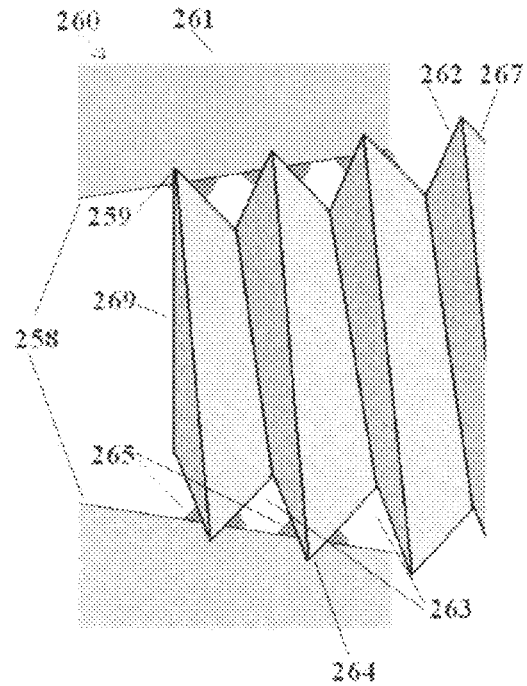
Figure 11C:
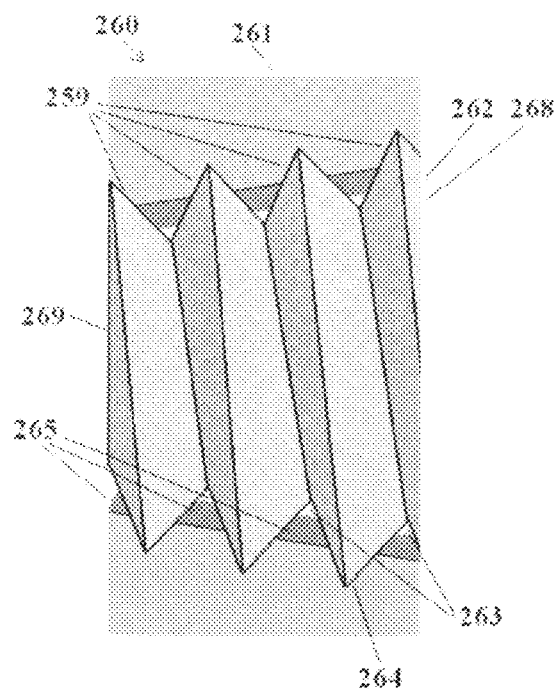

FIG. 11A-11C is an enlargement of a fastener 260 with an unthreaded internal cone 158 inside workpiece 261 being self-tapped by an external conic threaded 262 male component 269. FIG. 11A shows an unthreaded internal cone 258 with external thread 262 of male component 269 penetrating to position 266 where the first contact is made at 264. The rotation of the external thread 262 to position 267 forms the internal teeth 259 in blank internal cone 258 as shown in FIG. 11B. The deformed material 265 is forced in the space 263 between the blank cone 258 and the external thread 262. By FIG. 11C the maximum penetration to position 268 is complete with the deformed shape creating the internal teeth 259 forcing the excess material 265 in the spaces 263.

Figure 12A:
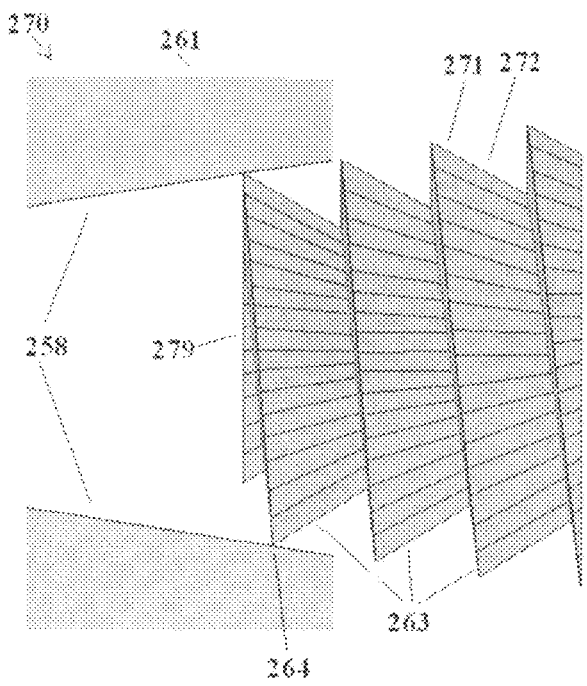
FIGS. 12A-12C is are cut away side views of another embodiment of the fastening system of the present invention with a fastener and workpiece cut away to illustrate the engagement of a conic tip of a self-tapping conic threaded fastener forming threads in a workpiece by cutting them out of an unthreaded conic opening therein.
Figure 12B:
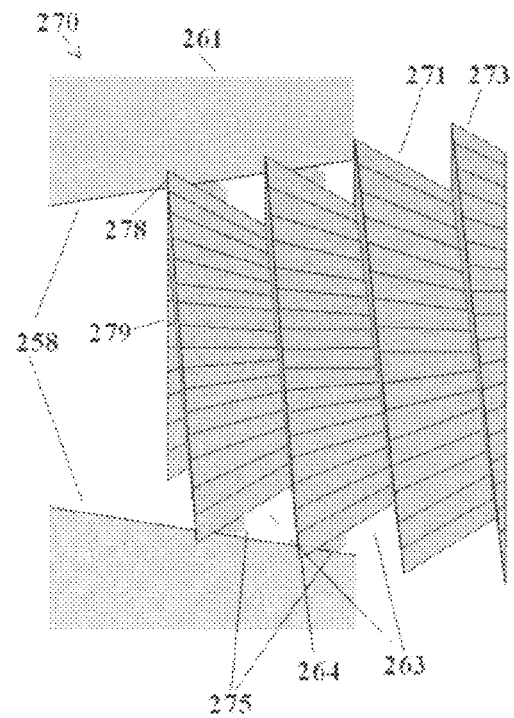
Figure 12C:
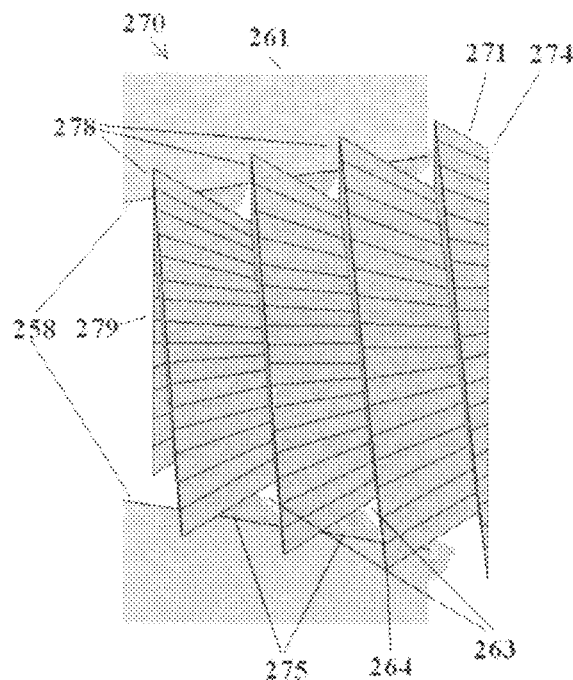

FIG. 12A-12C is a self-tapping process 270 that cuts the threads 278. FIG. 12A shows the same unthreaded internal cone 258 in workpiece 261 as in FIG. 11, with a serrated external thread 271 in the male component 279 at starting position 272. The first tooth 264 is ready to be cut with space 263 clear enough to receive the excess material. In FIG. 12B, cutting of the first tooth has started with the excess material 275 flowing into space 263. By the completion in FIG. 12C the tooth spaces 263 are nearly full of the excess material 275 from the internal teeth 278. The external tooth 264 along with the others has achieved their maximum depth. This cutting is used for brittle materials, such as cast iron, that cannot be deformed as shown in FIG. 11A-11C 260.

FIGS. 13C-13D show a fastening system 295 having a bolt type fastener 286 and a mating conic seat nut 290. The conic seat nut in FIG. 13A-13B 290 has a conic seat 281 and a standard thread 282 inside a hex shell 283. The bolt 285 in FIG. 13C-13D has a shank 286 that can be any length. The end has a receiving female conic thread 287 and a standard thread 288. The conic seat nut 290 is screwed on with standard internal threads 282 against external threads 282 in position 281 shown in the transparency of FIG. 13C. In FIG. 13D it is completed with the conic thread 287 mating with the conic seat 281 of the nut 290 at position 292. This conic seat 221 can also be self-taping. As with the hybrid fastener of FIG. 8, this arrangement provides the locking and sealing characteristic of the conic thread. This fastener will prevent water or other corrosives from getting past the conic seat into the conventional threads. The conic thread fastens more then conventional threads with more surface contact on multiple flanks, providing a locking feature. In some embodiments no shown, the fastener is self-tapping and forms the conic thread on conic seat when used the first time. This is a cheaper way to achieve the conic thread fastening without the cost of threading the conic seat.

FIGS. 14C-14D shows the conic head nut fastener 300. FIG. 14B is a top view of FIG. 14A showing a hex sided nut 301 with a standard internal thread 302 that extends below the nut inside a conic head 303. This conic head can fit into a receiving conic seat (not shown) or can self-tap inside a counter-sunk 306 hole 305 demonstrated in FIG. 14C and FIG. 14D. In FIG. 14C a standard thread shaft 304 from a bolt or threaded rod is extending out of a hole 305. The conic head nut 301 is penetrated by the threaded rod 304 in position 307. By FIG. 14D the conic head nut has been rotated down the threaded rod 304 to position 308 completing the fastening. It has self-tapped a thread 309 with the conic head 303 in the cone shaped counter-sink 306.

What is distinguishing about the conic head nut is that it is variable. Most of the conic fasteners are very fixed in their application. The conic head nut can fit any length threaded rod. The standard internal thread makes it applicable like most nuts. The difference is the conic head that is a locking and sealing device to hold the nut in place and keep out corrosives.

Another unique application of fasteners having conic threads is in a press collar system 320 demonstrated in FIGS. 15A-15D and FIGS. 16A-16D. The press collar system 320 is a fastening system that also creates a seal. It provides a friction fastener by squeezing the slotted sides 322 against any elongated member 324 it is mounted on and provides a seal with the last one or more threads 329, which are not slotted. The elongated member 324 can be a pipe, shaft, or threaded rod, as long as it is a matching surface. Here the elongated member 324 is shown as a shaft.

FIGS. 15A-15D has a cut-away of the conic seat 323 in the socket collar 335. FIGS. 16A-16B is a cut-away of press screw 336 and FIGS. 16C-16D is the end view of the press screw 336 opened at position 327 and closed at position 328. The press screw 336 has a conic head 321. The conic head 321 has been sliced so it has threaded tabs 322. The last tooth 329 is not sliced and creates the seal.

Figures 15A, 15B:
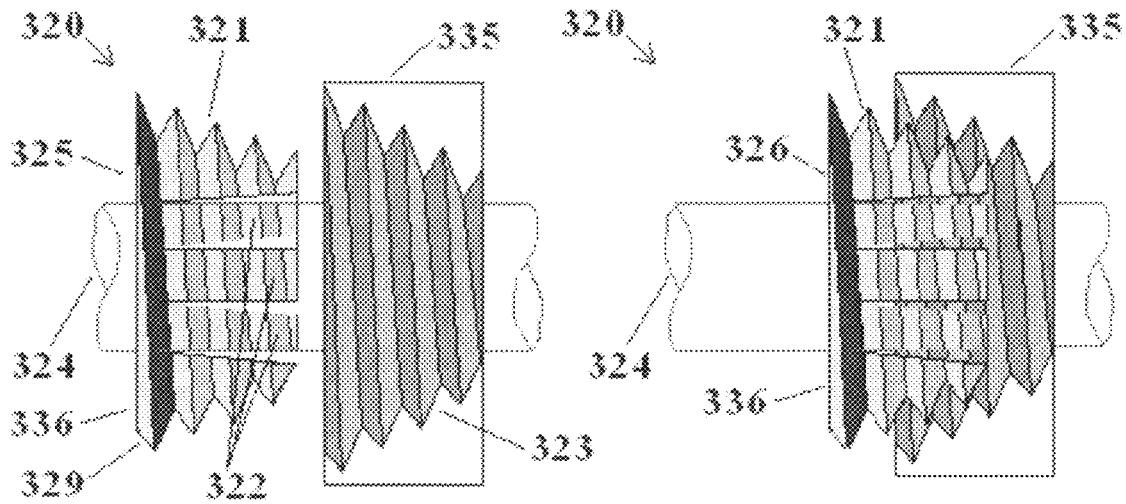
FIGS. 15A-15D are partial cut away side views of another embodiment of the fastening system of the present invention where the system takes the form of a conic locking collar with a combination of bendable members that compress onto a receiving shape to engage and a fixed thread that can form a seal.
Figures 15C, 15D:
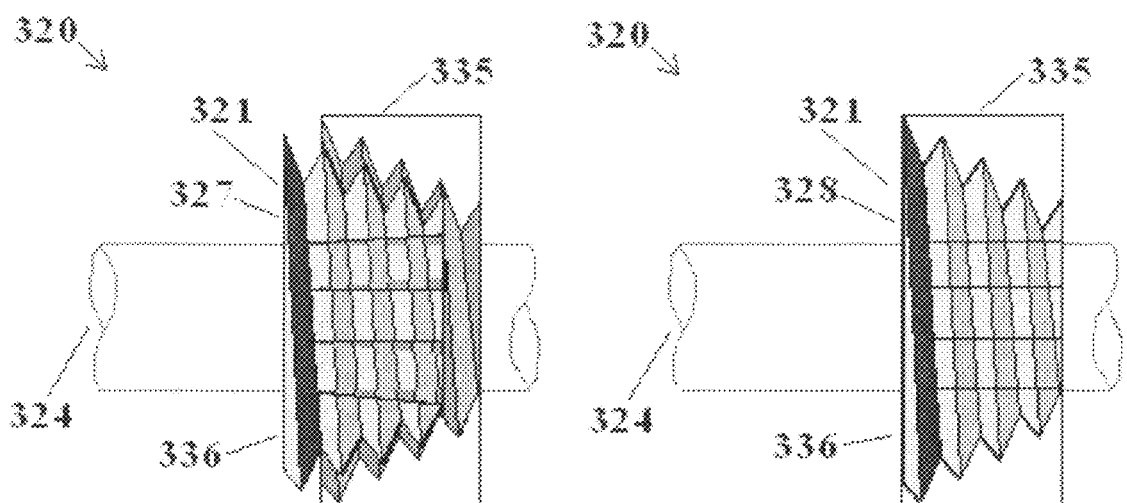
Figure 16A:
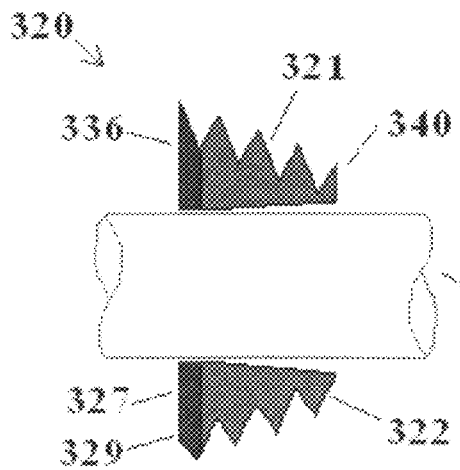
FIG. 16A is a cross section side view of the conic locking collar from FIGS. 15A-D highlighting the bendable members.
Figure 16B:
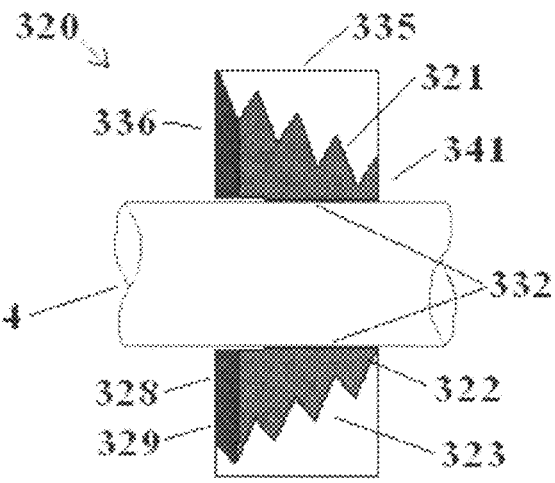
FIG. 16B is a cut away side view of the conic locking collar of FIG. 16A shown with the bendable members under compression.
Figure 16C:
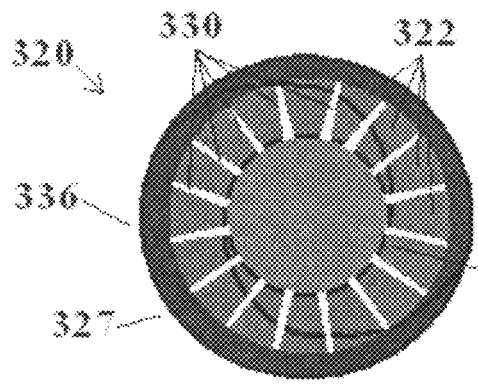
FIGS. 16C-16D are end views of the conic locking collars of FIGS. 16A-16B
Figure 16D:
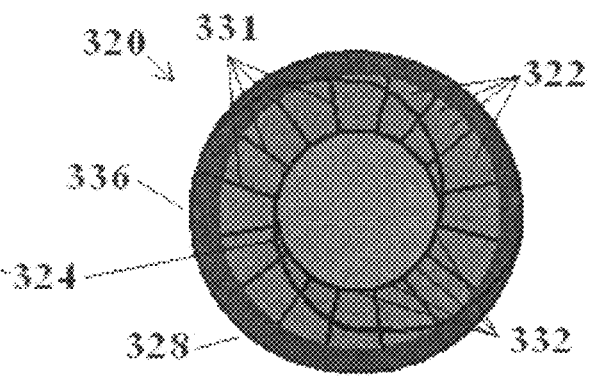

In FIG. 15A the conic head 321 is at position 325 on the elongated member 324 in front of the conic seat 323. In FIG. 15B the conic head 321 has penetrated the conic seat 323 to position 326 where the teeth make initial contact. In FIG. 15C the conic head has been rotated once to position 327. There is still space between the flanks of the teeth. In FIG. 15D the rotation to position 328 has compressed the threaded tabs 322 to closure.

In FIG. 16A shows the tabs 322 before compression bent upwards. FIG. 16B shows the tabs 322 after compression inside the conic seat 323 of the socket collar 335 at position 328. FIG. 16C is side view of FIG. 16A before compression with the tabs 332 bent outwards 330 and FIG. 16D is a side view of the press screw 336 from FIG. 16B after compression with the tabs 322 bent inwards 331. The compression seal 332 against the elongated member 324 created by all the tabs 322 fitted together in FIGS. 16B and 16D. The last tooth of the conic head 329 creates the locking seal within the fastener.

The press collar system 320 can be around a pipe, a gas line or any shaped stock. It can be incorporated in compression fittings for gas and liquids or anchors in solid or threaded stock. The compression creates increased resistance due to surface friction under pressure.

Figures 17A, 17B:
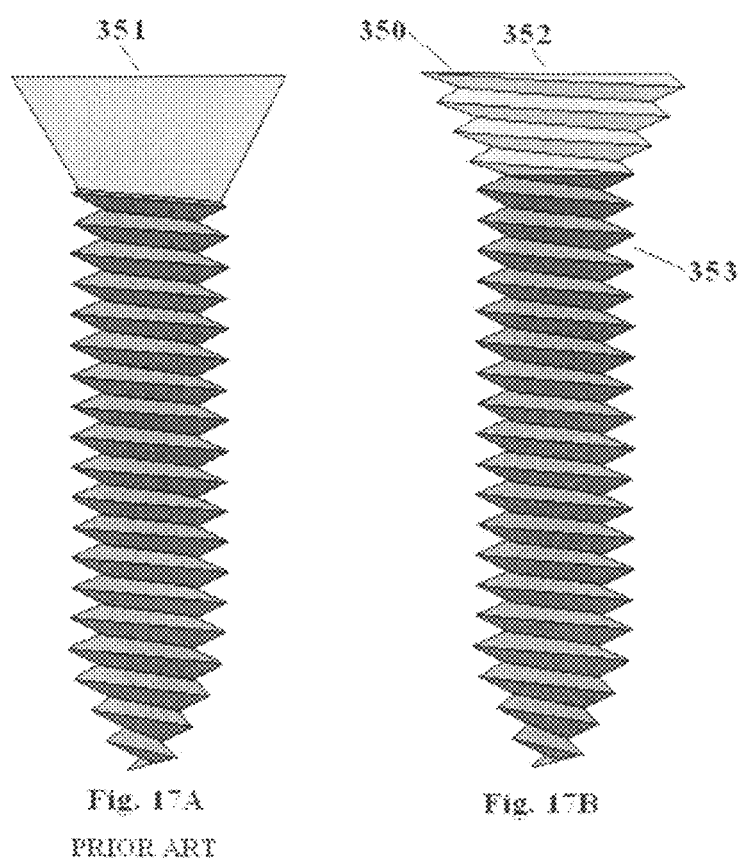
FIG. 17A is a standard flat head screw.
FIG. 17B is a flat head screw with a conic head.

FIG. 17A shows a standard flat-head wood screw 351 and FIG. 17B shows a conic-head wood screw 350. The conic head 350 wood screw has a conic head 352 with the standard wood screw thread 353. This will work best with counter-sunk holes.

Another application of the conic thread is in tamper resistant fastening. These are screws designed to be installed easily, but difficult to remove. FIG. 18A is an example of such a design 370 with a standard screw thread 373 having a conic head 372 and a common tamper resistant pan head 371 that is difficult to remove once installed. The conic head provides the conic threads with the flanks of the male and female threads having 95% plus surface contact. The coefficient of resistance of their materials will make this difficult to unscrew. Coupled with a mechanical connection that is secure in the direction of application, but unworkable in the direction of removal. On method of overcoming tamper resistance is to increase the pressure on the head while unscrewing. With the conic threads, increasing the downward pressure increases the resistance because of the coefficient of friction over the surface contact area of the threads, making it even more difficult to remove. This is a more tamper resistant fastener then currently is on the market.

FIG. 18B is a right side view of the tamper resistant pan head 371 in FIG. 18A. The face 374 in FIG. 18A is where a regular screwdriver blade will push against for twisting on. The sloped sides 375 in FIG. 18B will not give a screw driver any place to hold so twisting off is difficult. This coupled with the resistance of the conic head increases the level of difficulty.

FIG. 18C is a top view of FIG. 18A that contrasts the slope side of 375 and the abrupt face of 374.

There are a variety of tamper resistant head designs in the current art that can be incorporated into this application.

The conic thread fastener 400 can also change the shape of its thread as shown in FIG. 19A-19C. In FIG. 19A the male cone member 401 with an external thread 403 is in contact with the female mating member 402 and its internal thread 406. This is at the external 403 and internal 406 threads initial contract position 410. The shape of the external threads 403 crests 404 become narrow and as the shapes of the roots 405 become correspondingly wider. The mating internal thread 406 crests 407 become wider as its roots 408 become narrowed. In FIG. 19B the spaces 414 between the mating teeth are uneven. As the conic fastener 400 is completely engage in FIG. 19C the uneven spaces have disappeared. This is possible because the change in the tooth shape is to a smaller shape 415 and gradual enough to fit into the larger cavity 416 of the larger shape as it is approaching is final mating position 417.

In FIG. 19D-19F the change in shape as a self-tapping fastener 420 has other implications. FIG. 19D has the male cone member 401 with an external thread 403 in contact with the internal cone surface 425 in member 426 at position 421.

In FIG. 19E the crests 404 of the external thread 403 at position 422 are deforming the cone surface 425 to form teeth 427. The material 428 from this deformation is moved into the space 490. As the thread is cut to is maximum depth at position 423 in FIG. 19F it should be noted that the spaces between the teeth 429 are uneven. The amount of material deformed has become smaller corresponding with the smaller teeth. This is an example where the cone shaped surface 425 cut in member 426 can be a different angle then the male cone member 401. A shallower angle (not shown) could be used to distribute the space 429 evenly.

The advantage of the diminishing threads in FIGS. 19A-19D is that the turning force applied to the threads 403 at top of the fastener 400,420 diminishes with the size of the thread. Less force is applied at the bottom of the thread 416 where the male member 403 is smaller then at thread 418 where the male member is larger. This is a method for distributing and matching the stress loads of the torsion of rotation from stronger 418 to weaker parts 416 of the male member 403.

The conic thread can be employed as a fastener of lids, covers or circular doors. These may be a jar of olives, the hatch on a submarine, the door of a vacuum chamber or the breech of an artillery tube. What they all have in common is the tangential distance between the threads and mating surfaces. These mating surfaces can be v-shaped, square, round or anything that can be machined. They will have a large percentage of mating surfaces that fasten so completely they create a seal.

Figure 20:
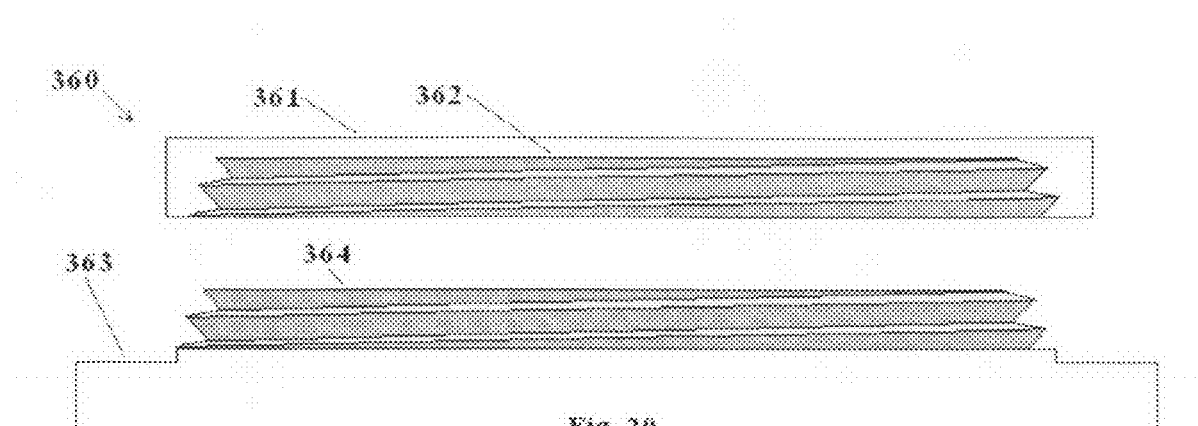
FIG. 20 is a cut away side view of still another embodiment of the fastening system of the present invention where the system takes the form a jar and cover with mating conic threads.

In jars or bottles, one half turn can engage as many as six threads for quick use and secure fit. The bottle 360 depicted in FIG. 20 has a cover 361 for a bottle top 363. There is an internal conic thread 362 that will mate with external conic thread 364. This is the same fastener as in FIGS. 2, 6 and 7. The difference is the conix angle, the number of leads, the starting diameter, and the length of the thread and the shape of the mating surfaces. These characteristics can be varied to cover a wide range of applications.

Figures 21A, 21B, 21C:
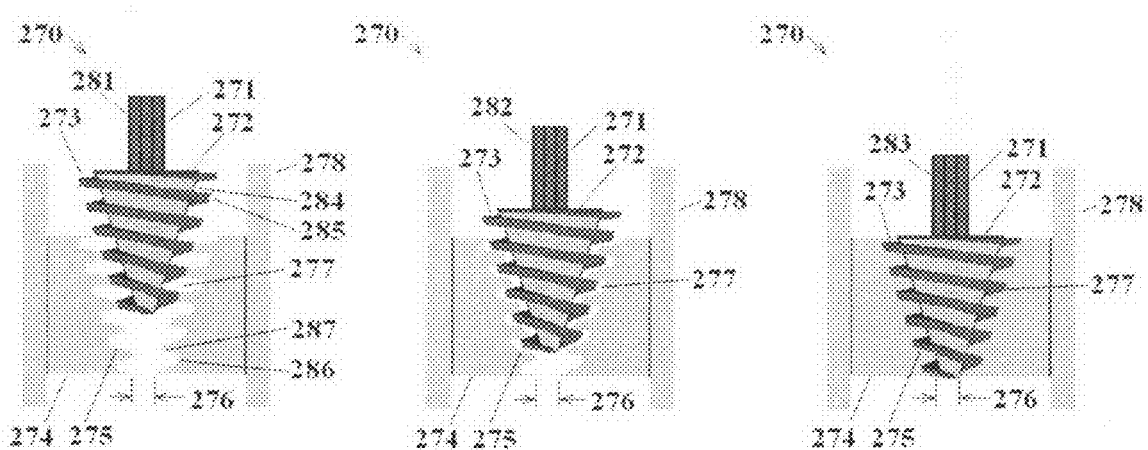
FIG. 21A-21C are cut away side views of the conic valve with the conic threads acting as both the valve seat and the securing threads being seated.

FIGS. 21A-21C are a unique application of the conic threads as a conic valve 270. In FIG. 21A a control rod 271 is attached to a threaded plunger 272 that has an external thread 273 with crests and roots shaped similarly to those of FIGS. 7A and 7B; i.e. flat shapes forming substantially flat surfaces 284, 285, 286, 287. The plunger 272 is in position 281 in contact with receiving member 274 that has a matching double lead internal thread 275. This receiving member 274 is in a housing 278 and has an opening 276 at the bottom. The cavity 277 between the threads is the space where fluid or gas flows. At this position 281 the valve 270 is open. The spiraling shape of the threads will cause the fluids/gas to be ejected in a twisting vortex (not shown).

In FIG. 21B the conic valve 270 is half closed. The cavity 277 between the teeth has been reduced and has changed it shape. By FIG. 21C the cavity is gone and the conic thread seal is fully engaged throughout the entire thread.

Figures 22A, 22B, 22C:
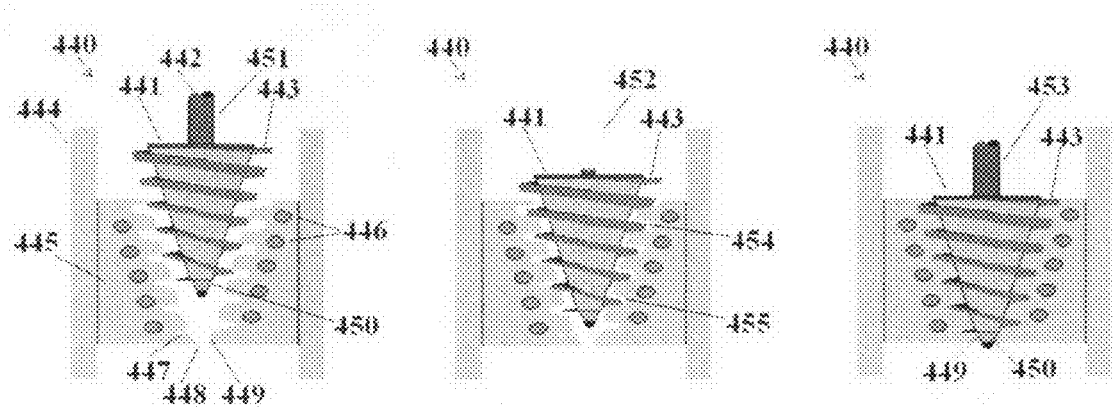
FIGS. 22A-22C are cut away side views of the conic valve with threads that morph into a different geometry over their length.

FIG. 22A-22C is a conic valve with morphing threads 440 shown at three positions. FIG. 22A has the male plunger 441 with a control rod 442 and external threads 443 at the open position 451. The receiving female member 445 is in a housing 444 and has optional heating or cooling elements 446 and the internal conic thread 447. This is shown with a secondary stopper 450 and secondary stopper seat 449.

The morphing thread is changing its shape and/or its size. In this case it is a square thread becoming narrow like the diminishing thread in FIG. 19. The change in shape allows the cavity between the threads to change so cavity 454 is larger then cavity 455. This is an advantage in high-pressure gas applications in that the gas can expand. The morphing aspect may be much larger than it has been portrayed in FIGS. 21 and 22. The larger angles of the cone and steeper helix angle of the threads will make the changes in cavity sizes more dramatic.

The secondary stopper 450 and secondary stopper seat 449 is a backup for wearing on the threads. Over time gas or fluids will induce wear on threads. This secondary backup is to extend the useful life of the valve. The conic valve lends itself to high-pressure applications in that it does not require a multi-valve step-down. The long thread enables allows a very small passage whose size can be precisely controlled to expand. Further, the geometry of the thread and the spinning vortex that it outputs will actually be quieter then a straight open blast from a high pressure to a lower pressure state. This is because the flow is organized verses chaotic. This will impact on controlling mixing.

As shown in FIGS. 22A-22C, the conic valve also lends itself to warming or cooling the gas/fluids that it is passing through it with built in heating or cooling elements 446. For gases, the reduction is pressure will result in the reduction of temperature and an increasing pressure will increase temperature.

Referring now to FIGS. 23-31, the basic concept of the spiral thread is described. The spiral thread is a thread on a body having an expanding shape such as a concave, convex or conic shape. As noted above, in embodiments in which the spiral thread is disposed upon a body having a conic shape, it is referred to as a conic thread. In all other embodiments, it is referred to as a spiral thread.

Figure 23A:
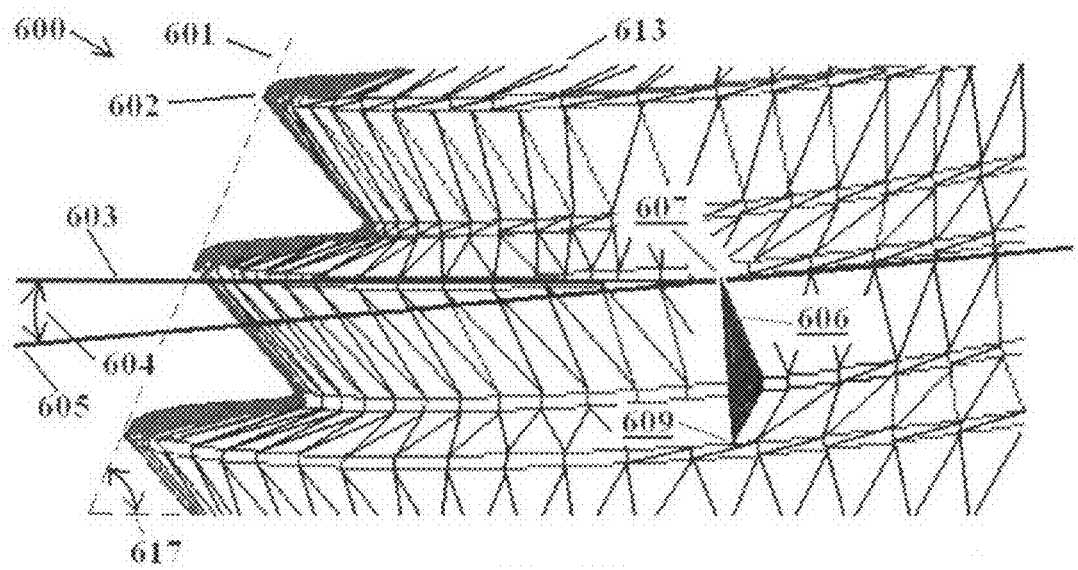
FIG. 23A is partial isometric view of an external conic threaded fastener showing the thread profile and its relationships.

FIG. 23A shows an embodiment of a spiral threaded fastener 600 having a body 613 with a conic shape about which a conic thread 602 is disposed. As such, this fastener 600 is both a spiral threaded fastener and a conic threaded fastener. The spiral thread 602 takes the shape of a mathematical spiral that is wrapped around the cone body 613. The spiral thread 602 forms a helix angle 604 relative to the conix angle 617 of the thread profile 606 at a given point along the spiral thread 602. Standard threads use a plane perpendicular to the axis of the body as its base plane, and the angle of the threads off that plane is the helix angle. The standard threads are on a cylindrical body and helix angle is constant. The body 613 of a spiral thread is never cylindrical and the helix angle 604 is defined relative to the conix angle 617 of that body. On a conic body 613, conix 617 is constant and is defined by a plane perpendicular to the centerline of the body and a profile plane 601 touching each crest 607 of the spiral thread 602. On a concave or convex body, the conix angle it is constantly changing and is relative to a specific point on the spiral.

Figure 23B:
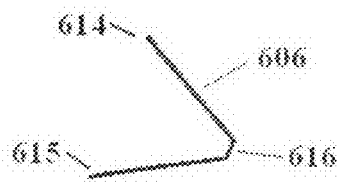
FIG. 23B is diagrammatic view of the triangular shape of a thread profile used in FIG. 23A.

A thread profile 606 is defined as the shape formed from any point on one crest 607 of the spiral thread 602 to a corresponding point on an adjacent crest. The thread profile 606 at position 609 of FIG. 23A is extended from this point on one crest 607 in a direction that is oriented perpendicular to the helix line 605 at the conix angle 617. This is true for any corresponding point on the spiral thread 602. Because the diameter is changing, the helix line 605 will be different at any place along the spiral 612. What is relevant is the beginning and end points of the thread profile 606 on the surface of the conical body. The internal and external threads will have the same mating profiles. In FIG. 23B, the thread profile 606 is shown with its beginning on crest 614, root 616 and ending on crest 615. The thread profile is cut into the body 613. The crest 614 forms a flat space on the surface of the body 613 where one profile 606 ends and another begins. This space allows the thread profile 606 to float. It becomes integrated into the thread system with the corresponding internal thread having the same space. The spiral thread 602 can be designed to have a constant distance between each wrap around the body 613. The thread profile 606 is not constant; it is governed by the reducing helix angle 604. This reduction will cause the length of the thread profile 606 to approach the tangential distance between adjacent points on the spiral thread 602. This float allows for an easier design.

The spiral thread 602 can be designed to be the exact width of the thread profile 606. What is relevant is that the external and internal surfaces of the threads fully engage. The internal thread movement is downward and outward as it is being screwed together. During this movement it has diminishing space between the respective profiles until all possible thread profiles are fully engaged. The full engagement has no space. This is demonstrated in FIGS. 24A-C.

In FIG. 24A the body 613 of the spiral threaded fastener 600 is at position 631 relative to the cross section of work piece 630. The bottom point 636 of the spiral thread 603 at position 637 defines a space 634 between it and the work piece 630. In FIG. 24B the body 613 of the spiral threaded fastener 600 has rotated one revolution down to position 632 and the bottom point 636 at position 638 defines a smaller space 635. In FIG. 24C the body 613 of the spiral threaded fastener 600 is at its full engagement position 633 and the bottom point 636 at position 639 is in contact with the workpiece 630. This demonstrates that, with a spiral threaded fastener 600 having a conic body 613, all the surfaces of internal thread 630 and external thread 613 engage at the same rate. As described below, spiral threaded fasteners having the convex and concave shaped bodies engage at different rates.

FIG. 25A shows a portion of a concave threaded fastener 650 having a body 651 with a concave shape. Thread profile 653 is formed between the outer surface of the body 651 and the profile plane 652. The concave shape of the body 651 curves inwards as it ascends. The thread profile 653 shown in FIG. 25B is a sine wave shape, although this is for illustrative purposes only and other thread profiles may be of different shapes.

Figure 26A:
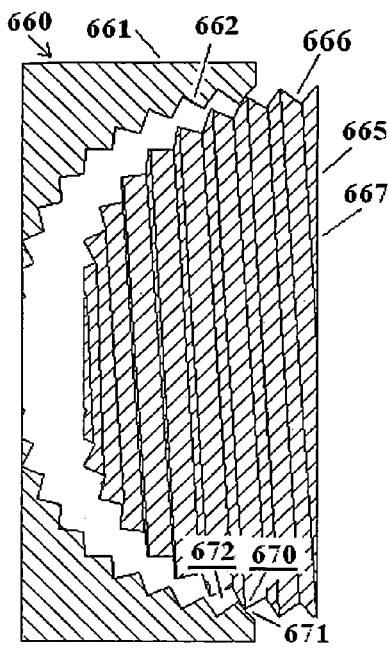
FIG. 26A is a cut away side view of a spiral threaded fastener with a body having a concave surface positioned at a point of initial contact with a mating spiral threaded workpiece.
Figure 26B:
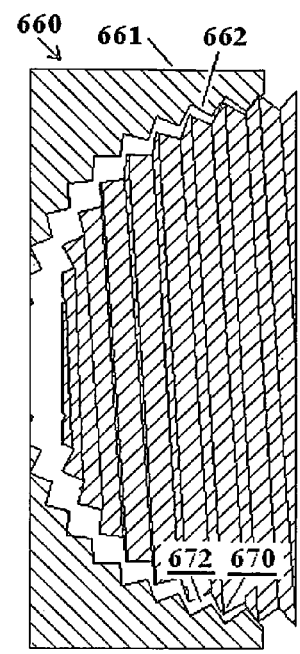
FIG. 26B is a cut away side view of the spiral threaded fastener and workpiece of FIG. 26A positioned after one rotation of the fastener.
Figure 26C:
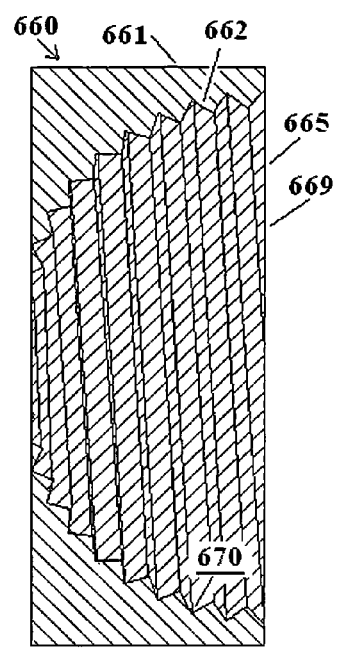
FIG. 26C is a cut away side view of the spiral threaded fastener and workpiece of FIGS. 26A and 26B positioned at the terminal engagement inside the concave shaped internal spiral threaded work piece.

FIGS. 26A-C show a spiral threaded fastening system 660 made up of a spiral threaded fastener 665 with a concave shape mating with a workpiece 661. The workpiece 661 has an internal spiral thread 662. In FIG. 26A the spiral threaded fastener 665 has a mating external spiral thread 666 at position 667. This is the position of initial contact as demonstrated where the internal thread point 670 makes contact with the internal thread point 671. Note the space between these thread at 672. In FIG. 26B the internal spiral thread 666 has rotated one revolution to position 668. The internal point 670 has moved in one thread width and the space between the threads at 672 has diminished. A second rotation in FIG. 26C has all the surfaces engaged. There are no spaces between the teeth. As shown in these figures, concave shaped spiral threads make initial contact at the larger diameter and than progressively engage inwardly as the fastener 665 is rotated.

Figure 27A:
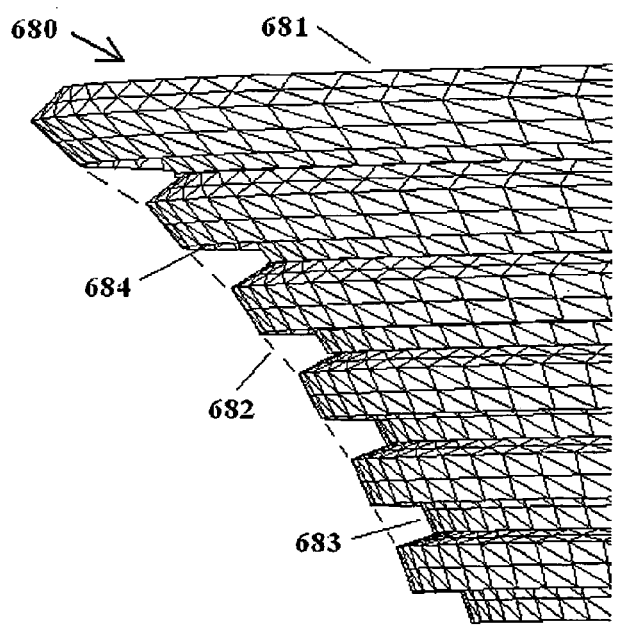
FIG. 27A is a partial side isometric view of a spiral threaded fastener with a body having a convex surface.
Figure 27B:
FIG. 27B is a diagrammatic view of the thread profile of the fastener of FIG. 27A.

FIG. 27A is a portion of a spiral threaded fastener 680 with a body 681 having a concave shape and a spiral thread 684 wrapped around the body 681. The thread profile 683 is square shaped as diagramed in FIG. 26B and follows profile curve 682. The convex shape 682 curves outward as it ascend.

Figure 28A:
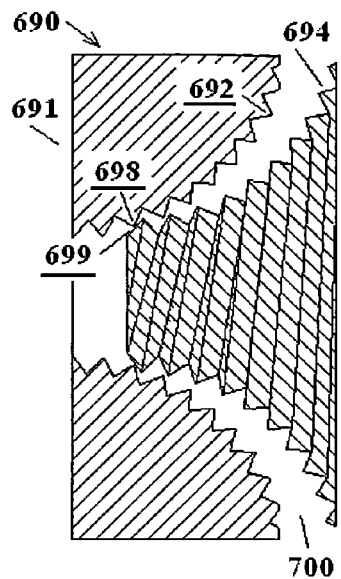
FIG. 28A is a cut away side view of a spiral threaded fastener with a body having a convex surface positioned at a point of initial contact with a mating spiral threaded workpiece.
Figure 28B:
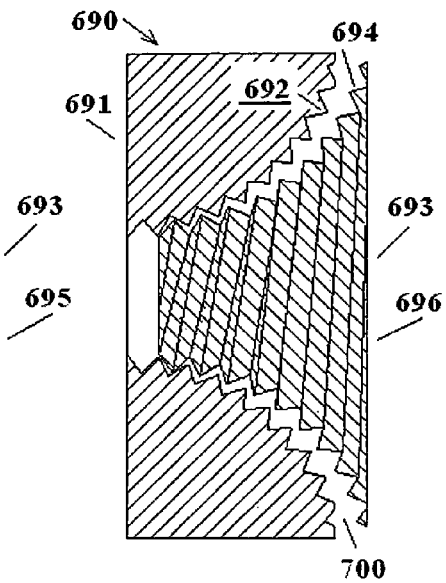
FIG. 28B is a cut away side view of the spiral threaded fastener and workpiece of FIG. 28A positioned after one rotation of the fastener.
Figure 28C:
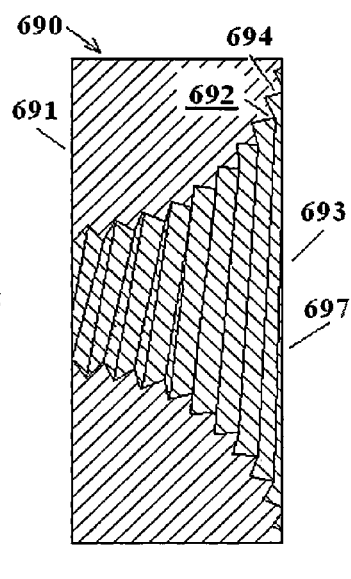
FIG. 28C is a cut away side view of the spiral threaded fastener and workpiece of FIGS. 28A and 28B positioned at the terminal engagement inside the convex shaped internal spiral threaded work piece.

FIG. 28A-C show a spiral threaded fastening system 690 made up of a spiral threaded fastener 693 with a body having a convex shape mating with a workpiece 691 and demonstrate the engagement of a work piece 691 with an internal convex spiral thread 692 with a spiral threaded fastener 693 with an external convex spiral thread 694. The workpiece 691 has an internal cross section that the spiral threaded fastener 693 is shown to engage.

In FIG. 28A the spiral threaded fastener 683 at position 695 is at the initial engagement of the internal spiral thread 692 of the workpiece 691 at point 698 with the external spiral thread 694 at position 699. The initial point of contact is where the external spiral thread 694 is inserted into the internal work piece 692 until contact 698,699. Note the large space at the other end of the threads at position 700. The next stage of engagement is to rotate the spiral threaded fastener 693 such that the spiral thread 694 is at position 696 in FIG. 28B. The space between the threads at position 700 has diminished. A second rotation results in the complete engagement of all surfaces, as shown in FIG. 28C.

The difference between fastening systems utilizing conical spiral threaded fastener 600 of FIGS. 23-24, the concave spiral threaded fastener 665 of FIG. 26, and the convex spiral threaded fasteners 680 and 693 of FIGS. 27 and 28A-28C is how the threads come together. The conical spiral threaded fastener 600 has a uniform same space between the threads at any position. The concave spiral threaded fastener 665 has initial contact at the outer diameter with a space that increases in size toward the inner diameter. The convex spiral threaded fasteners 686 and 693 have initial contact at the inner diameter with the space increasing as the diameter increases. These are properties that can be applied to the thread design. For example, the convex thread can squeeze out any fluid as it is closing as in the application of a valve.

Figure 29A:
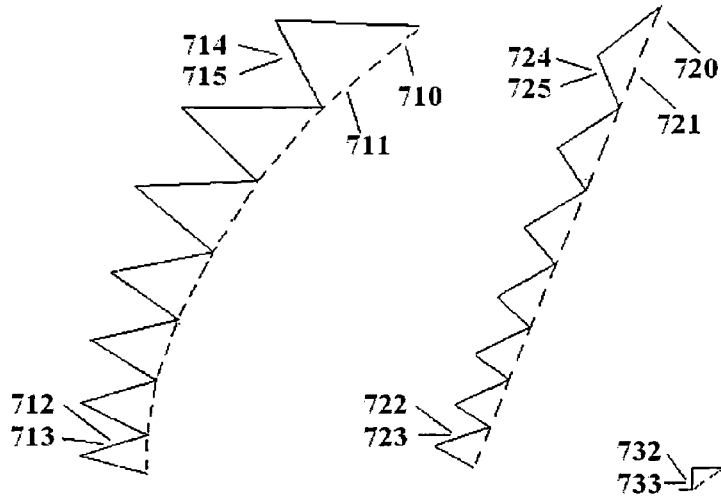
FIG. 29A is partial cross sectional view of a spiral-threaded fastener showing a triangular shaped spiral thread disposed on a body having a concave shape.
Figure 29B:
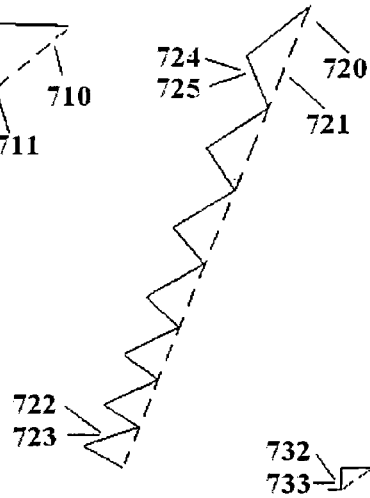
FIG. 29B is partial cross sectional view of a spiral-threaded fastener showing a triangular shaped spiral thread disposed on a body having a conical shape.
Figure 29C:
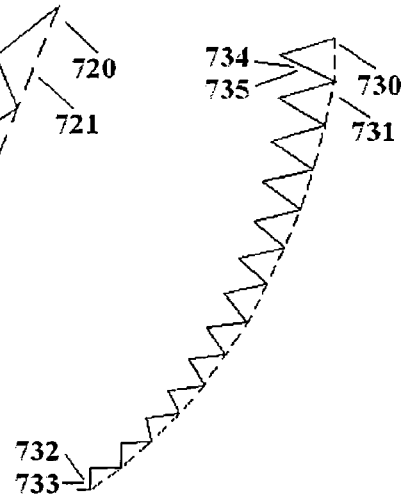
FIG. 29C is partial cross sectional view of a spiral-threaded fastener showing a triangular shaped spiral thread disposed on a body having a convex shape.

The shape and size of the thread profile on the spiral threads can change over the length of the thread. FIGS. 29A-C shows three spiral threaded fasteners with expanding V-shaped thread profiles. FIG. 29A is a cross section of a spiral thread 710 on body 711 having a concave outer shape. The thread profile 712 at position 713 is V-Shaped. Over the course of the thread to position 714 the profile 715 has increased its size while maintaining the same shape as position 713.

FIG. 29B is a cross section of a spiral thread 720 on a body 721 having a conical shape. It also has a V-shaped thread 722 at position 723. Over the course of this thread, the width of the thread profile as expanded at a constant rate while the depth has remained resulting in the thread profile 724 at position 725. FIG. 29C is a cross section of a spiral thread 730 on a body 731 having a convex shape. Its V-shaped profile 732 at position 733 has a constantly expanding depth while its width remains the same. By position 735, the thread profile 734 has twice the depth.

As FIGS. 29A-C demonstrates, the spiral thread can morph into different shapes along its course. The property that is unique to the spiral thread is local clearance. The limit of change in the thread profile is in the space between male and female threads as they are passing through to there terminal engagement. If it fits, it works. These threads can also be combined in many ways. A convex thread can be combined with a conical thread as a single unit as long as their rate of penetration per rotation is the same.

Changing threads sizes and/or using concave, conical or convex outer shapes lends it to rolling threads. A corrugated pipe can have a spiral threads added at the ends and it would still be rolled from a flat sheet of metal. This is achieved by changing the size of the corrugation with the change in diameter.

Figure 30:
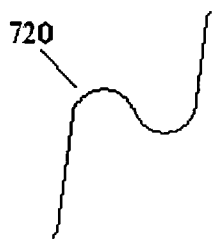
FIG. 30 is a diagrammatic view of a thread profile of an alternative embodiment of the threaded fastener in which the thread profile is shaped like a hook.

The spiral thread concept lends itself to other types of configurations that maximize the material properties. In FIG. 30 is a thread profile 710 that has a longer shape forming an upwards pointing hook. This holds the internal and external components together differently. A plastic external thread on a steel internal thread will hold better because the deformation of the plastic by a shearing force will resist more with this hook form. There are many shapes that can be used as a thread profile to enhance the geometry of the overall thread provided the shape allows local clearance.

Figure 31A:
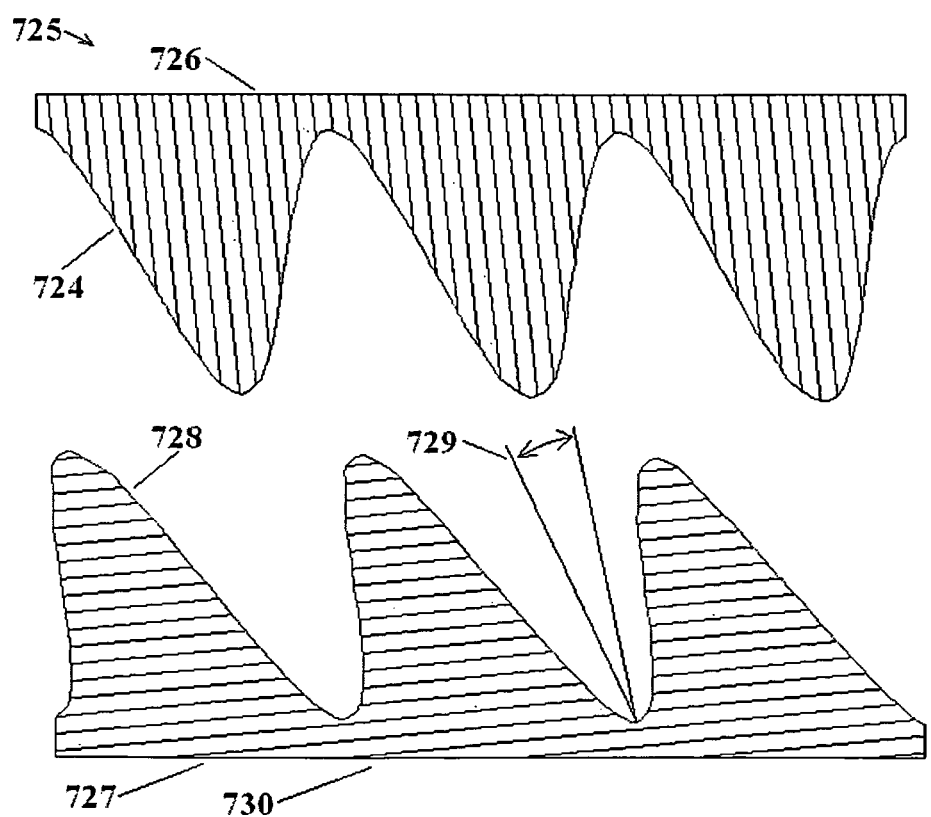
FIG. 31A is a partial cross sectional view of a spiral threaded fastener positioned over another threaded workpiece which the workpiece has skewed teeth.
Figure 31B:
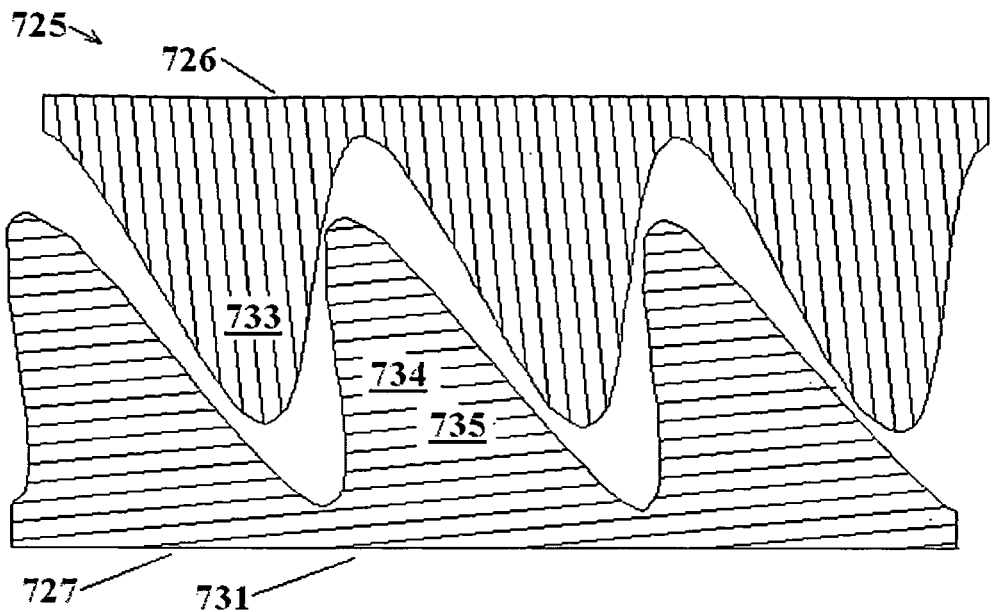
FIG. 31B is a partial cross sectional view of the spiral threaded fastener and workpiece of FIG. 31A positioned at a point of terminal engagement showing the deformation of the skewed threads to fit.
Figure 31C:
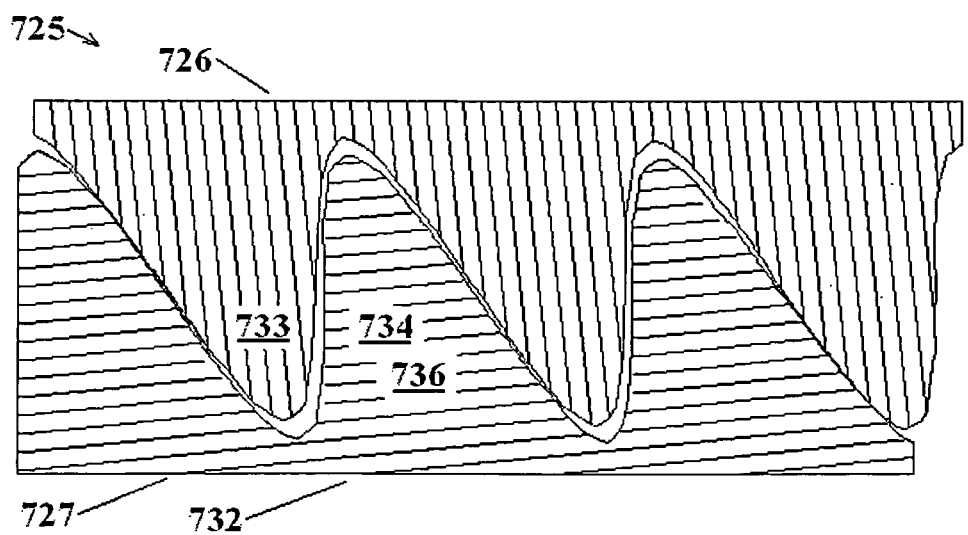

Another way to exert force on the spiral threads is to add a spring action to the threads. This is shown in FIG. 31A-C with a cross section of an internal work piece 725 cut off along body 726 and an external mating component 727 at position 730. The internal work piece 725 has a normal sine wave thread profile 724. The external component has the sine wave thread profile 728 skewed 15%, as represented by skew angle 729.

FIG. 31B the external component 727 is at position 731, the point of initial contact of the threads 724 against the skewed threads 728. The tooth 733 has contacted the opposing tooth 734 at position 375. In FIG. 31C the skewed threads 728 have engaged the normal thread 724. The tooth 733 is against the opposing tooth 735, but its position changed to 736 because of the spring action of the material. This has taken more force to bring together and it can compromise the sealing aspect of the threads by not having all the surfaces engaged. The trade off is the more resistance to movement because of this design characteristic.

Figure 32A:
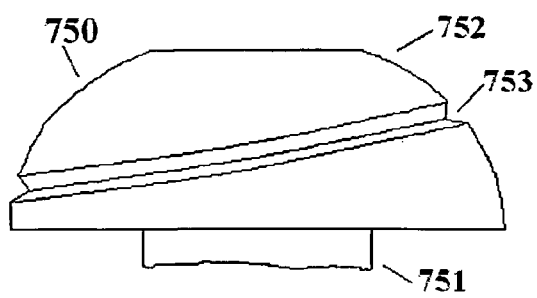
FIG. 32A is a side view of a single right-handed spiral thread on a concave head of a bolt.
Figure 32B:
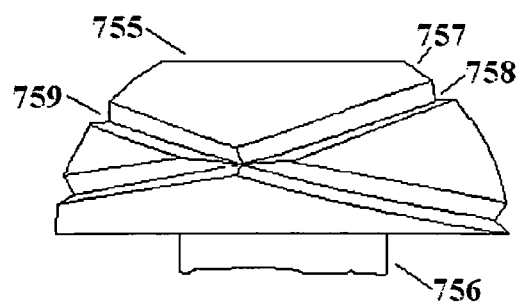
FIG. 32B is a side view of the right-handed thread of FIG. 32A plus a single left-handed spiral thread on the concave shaped head of a bolt.

There are applications for the spiral threads in mechanical couplings. One such application is shown in FIG. 32A, which is a bolt 751 with a dome shaped head 750 that has a concave shaped body 752 with a single right-handed spiral thread 753. This is an external spiral thread that mates with an internal single thread on a tool used to only tighten it. This is by designed for a secure attachment. FIG. 32B shows another bolt 756 having a dome shaped head 755. This bolt 756 has both a left-handed thread 758 and right-handed thread 759 on its head 755. This will require tool with the mating left-handed internal thread to tighten and another tool with a right-handed internal thread to loosening.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A conic threaded fastener comprising:
    a body comprising at least one substantially conic outer surface; and
    at least one conic thread forming a spiral about said at least one substantially conic outer surface of said body such that said at least one conic thread forms a plurality of crests and a plurality of roots;
    wherein a tangential angle formed by an intersection of a plane coincident with a tangent line extending perpendicular from a line tangent to a point on one crest of said at least one conic thread to a point on an adjacent crest of said conic thread and a plane perpendicular to an axis of said body increases as a diameter of said outer surface of said body decreases; and
    wherein a tangential distance measured along said tangent line between said one crest of said at least one conic thread and each adjacent crest is substantially constant.

2. The conic threaded fastener as claimed in claim 1 wherein said body consists of one substantially conic outer surface.

3. The conic threaded fastener as claimed in claim 1 wherein said body further comprises at least one substantially cylindrical outer surface and at least one conventional thread formed about said substantially cylindrical outer surface of said body.

4. The conic threaded fastener as claimed in claim 1 wherein said body comprises two substantially conic outer surfaces and one substantially cylindrical outer surface, wherein a first substantially conic outer surface comprises a conic head, wherein a second substantially conic outer surface comprises a conic tip, and wherein said substantially cylindrical outer surface is disposed between said conic head and said conic tip.

5. The conic threaded fastener as claimed in claim 1 wherein each of said plurality of crests and said plurality of roots forms a substantially flat surface.

6. The conic threaded fastener as claimed in claim 1 wherein said at least one conic thread comprises means for forming mating threads an unthreaded conic opening disposed within a workpiece.

7. The conic threaded fastener as claimed in claim 1 further comprising a nut having a top, a bottom, and an interior threaded bore, wherein said body extends from said bottom of said nut and comprises an interior threaded opening aligned with said interior threaded bore of said nut.

8. A conic threaded fastening system comprising:
    a conic threaded fastener comprising:
        a body comprising at least one substantially conic outer surface; and
        at least one conic thread forming a spiral about said at least one substantially conic outer surface of said body such that said at least one conic thread forms a plurality of crests and a plurality of roots;
        wherein a tangential angle formed by an intersection of a plane coincident with a tangent line extending perpendicular from a line tangent to a point on one crest of said at least one conic thread to a point on an adjacent crest of said conic thread and a plane perpendicular to an axis of said body increases as a diameter of said outer surface of said body decreases; and
        wherein a tangential distance measured along said tangent line between said one crest of said at least one conic thread and each adjacent crest is substantially constant; and
    a workpiece comprising:
        at least one opening disposed therein;
        wherein said at least one opening comprises at least one inner conic surface dimensioned to mate with one of said at least one conic outer surface of said body of said conic threaded fastener.

9. The conic threaded fastening system as claimed in claim 8:
    wherein said body of said conic threaded fastener further comprises at least one substantially cylindrical outer surface and at least one conventional thread formed about said substantially cylindrical outer surface of said body;
    wherein said at least one opening in said workpiece comprises at least one substantially cylindrical inner surface and at least one substantially conic inner surface;
    wherein said at least one substantially cylindrical inner surface is dimensioned and threaded to mate with said at least one substantially cylindrical outer surface of said body of said conic threaded fastener; and
    wherein said conic inner surface is dimensioned and threaded to mate with said conic outer surface of said body of said conic threaded fastener.

10. The conic threaded fastening system as claimed in claim 8:
    wherein one of said at least one substantially conic outer surface of said body of said conic threaded fastener comprise a conic tip; and wherein said workpiece comprises an end cap having a conic thread formed in said inner conic surface thereof for engaging said conic tip of said conic threaded fastener.

11. The conic threaded fastening system as claimed in claim 8:
wherein one of said at least one substantially conic outer surface of said body of said conic threaded fastener comprise a self-tapping conic tip; and
wherein said workpiece comprises a end cap having an unthreaded inner conic surface thereof for engaging said self-tapping conic tip of said conic threaded fastener.

12. The conic threaded fastening system as claimed in claim 8:
wherein said conic threaded fastening system comprises a press collar system further
comprising at least one elongated member;
wherein said conic threaded fastener comprises a conic head disposed about said
elongated member, said conic head comprising a plurality of threaded tabs and manufactured of a deformable material;
wherein said workpiece comprises a conic seat dimensioned for disposal about said
elongated member and mating with said conic head; and
wherein tightening of said conic seat onto said conic head causes said threaded conic seat to deform such that said threaded tabs are forced together and such that said conic head forms a compression seal with said elongated member.

13. The conic threaded fastening system as claimed in claim 8 wherein said fastener is disposed upon and extends from a container and wherein said workpiece comprises a cover for said container.

14. The conic threaded fastening system as claimed in claim 8:
wherein said conic threaded fastening system comprises a conic threaded valve system;
wherein said conic threaded fastener comprises a valve plunger; and
wherein said workpiece comprises a valve seat.

* * * * *